(12) United States Patent
Hou et al.

(10) Patent No.: US 12,494,686 B2
(45) Date of Patent: Dec. 9, 2025

(54) AXIAL MOTOR, POWERTRAIN, AND ELECTRIC DEVICE

(71) Applicant: Huawei Digital Power Technologies Co., Ltd., Shenzhen (CN)

(72) Inventors: Jining Hou, Shanghai (CN); Chaojie Shi, Dongguan (CN); Hua Lan, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/474,711

(22) Filed: Sep. 26, 2023

(65) Prior Publication Data

US 2024/0106288 A1    Mar. 28, 2024

(30) Foreign Application Priority Data

Sep. 27, 2022    (CN) .......................... 202222597152.7

(51) Int. Cl.
| | |
|---|---|
| *H02K 1/2798* | (2022.01) |
| *H02K 7/00* | (2006.01) |
| *H02K 7/08* | (2006.01) |
| *H02K 16/02* | (2006.01) |

(52) U.S. Cl.
CPC ........... *H02K 1/2798* (2022.01); *H02K 7/003* (2013.01); *H02K 7/086* (2013.01); *H02K 16/02* (2013.01)

(58) Field of Classification Search
CPC ...... H02K 1/2798; H02K 7/003; H02K 7/086; H02K 16/02; H02K 2205/03; H02K 5/1732; H02K 21/24
See application file for complete search history.

(56) References Cited

U.S. PATENT DOCUMENTS

2013/0147291 A1*  6/2013  Woolmer .............. H02K 15/02
                                                                                    310/58
2024/0022149 A1    1/2024  Reimnitz et al.

FOREIGN PATENT DOCUMENTS

| CN | 209608522 U | 11/2019 | |
|---|---|---|---|
| CN | 107408875 B | 12/2019 | |
| CN | 112491198 A | 3/2021 | |
| CN | 113794301 A | 12/2021 | |
| WO | WO-2012156719 A2 * | 11/2012 | ............. H02K 21/24 |
| WO | 2022089686 A1 | 5/2022 | |

* cited by examiner

Primary Examiner — Tulsidas C Patel
Assistant Examiner — Mohammed Ahmed Qureshi
(74) Attorney, Agent, or Firm — Conley Rose, P.C.

(57) ABSTRACT

An axial flux motor includes a motor shaft, a double-row angular contact ball bearing, and a stator. The double-row angular contact ball bearing is sleeved on the motor shaft and is fixedly connected to the motor shaft through a bearing inner ring of the double-row angular contact ball bearing. The stator is sleeved on the motor shaft through the double-row angular contact ball bearing, and the stator is fixedly connected to a bearing outer ring, so that the motor shaft can rotate relative to the stator. In this application, the double-row angular contact ball bearing is used in the axial motor, the double-row angular contact ball bearing can bear axial force generated through interaction between the stator and a rotor.

20 Claims, 16 Drawing Sheets

AXIAL MOTOR, POWERTRAIN, AND ELECTRIC DEVICE

CROSS-REFERENCE TO RELATED APPLICATIONS

This claims priority to Chinese Patent Application No. 202222597152.7, filed on Sep. 27, 2022, which is hereby incorporated by reference in its entirety.

TECHNICAL FIELD

This application relates to the field of motor technologies, and in particular, to an axial motor, a powertrain, and an electric device.

BACKGROUND

Due to a large air gap plane and a compact structure, an axial flux motor has features such as high torque density and high power density. Compared with a conventional radial motor, the axial flux motor has distinct application advantages in an application scenario with limitations on a dimension, a weight, and the like, and the axial flux motor is easy to be integrated in a scenario that requires high space utilization, for example, in an electric vehicle. Currently, during use of the axial motor, due to effect of a magnetic field between a stator and a rotor in the axial motor, a manufacturing process, and an assembly error, the stator in the axial flux motor bear an axial load from components such as the rotor. Therefore, an internal component of the axial flux motor is easily damaged, reducing durability of the axial motor. In addition, an unreasonably designed shaft occupies a large dimension in an axial direction. This weakens an advantage of a short shaft of the axial motor.

SUMMARY

This application provides an axial flux motor that can bear axial force without manual clearance adjustment, a powertrain, and an electric device.

According to a first aspect, this application provides an axial motor, and the axial flux motor includes a motor shaft, a double-row angular contact ball bearing, and a stator. The double-row angular contact ball bearing includes a bearing inner ring and a bearing outer ring that are rotatably connected, the double-row angular contact ball bearing is sleeved on the motor shaft, and the bearing inner ring is fixedly connected to the motor shaft. The stator is sleeved on the motor shaft through the double-row angular contact ball bearing, and the stator is fixedly connected to the bearing outer ring, so that the motor shaft can rotate relative to the stator.

In this implementation, when the axial flux motor includes one rotor, effect of magnetic force of attraction between the rotor and the stator enables the rotor to approach the stator. When the axial flux motor includes two rotors, force on both sides of the motor shaft is different due to different mounting precision or asymmetric air gap dimensions between the two rotors and the motor shaft and the stator. In the foregoing two cases, a bearing between the rotor and the stator is subject to axial force. In this case, the bearing between the rotor and the stator is easily damaged. Therefore, performance of the axial flux motor is further affected.

In this application, the double-row angular contact ball bearing is used in the axial motor, and due to a strong axial bearing capability of the double-row angular contact ball bearing, the double-row angular contact ball bearing can bear an axial load generated through interaction between the stator and the rotor, to protect the double-row angular contact ball bearing from damage of the axial force. Therefore, durability of the axial flux motor is improved. In addition, because a clearance of the double-row angular contact ball bearing is usually not adjustable, and different models of double-row angular contact ball bearings have different clearances, the stator and the motor shaft may be adapted by selecting the models, and there is no need to manually adjust a bearing clearance. Therefore, mounting difficulty is effectively reduced, and production efficiency is improved.

In a possible implementation, a dimension of the double-row angular contact ball bearing in an axial direction of the motor shaft is smaller than a dimension of the stator in the axial direction of the motor shaft. The dimension of the stator in the axial direction of the motor shaft is an axial dimension between two ends of the stator in the axial direction. In this solution, a dimension relationship between the dimension of the double-row angular contact ball bearing in the axial direction of the motor shaft and the dimension of the stator in the axial direction of the motor shaft is defined, to reduce a dimension of the motor shaft occupied by the double-row angular contact ball bearing. In this way, space for another component to be mounted on the motor shaft is provided, and utilization of internal space of the axial flux motor is improved. Therefore, an axial dimension of the motor shaft is reduced, and an axial dimension of the axial flux motor is further reduced.

In a possible implementation, a projection of the stator on the motor shaft in a radial direction of the motor shaft completely covers a projection of the double-row angular contact ball bearing on the motor shaft in the radial direction of the motor shaft. In this solution, a given space distance between the two ends of the stator in the axial direction of the motor shaft and two ends of the double-row angular contact ball bearing in the axial direction of the motor shaft is provided, so that the another component on the motor shaft may be located between an end of the stator and an end of the double-row angular contact ball bearing. Therefore, mounting of components on the motor shaft is more compact, and the axial dimension of the axial flux motor is reduced.

In one implementation, there is an air gap between the stator and the rotor. When an axial dimension of the double-row angular contact ball bearing is small, left and right shaft shoulders of the motor shaft may be disposed in an inner side of the stator, to further reduce a dimension of the air gap between the stator and the rotor. This helps increase torque and reduces the axial dimension of the axial motor.

In a possible implementation, the motor shaft includes a first motor half shaft and a second motor half shaft that are arranged in the axial direction of the motor shaft, the first motor half shaft and the second motor half shaft are detachably connected, the first motor half shaft is used for mounting a first rotor and the double-row angular contact ball bearing, and the second motor half shaft is used for mounting a second rotor.

In this implementation, the first motor half shaft and the second motor half shaft are detachably connected, and when the first motor half shaft and the second motor half shaft are in a detached state, the first motor half shaft and the second motor half shaft may be respectively used to perform a dynamic balance test with the first rotor and the second rotor. This helps restore a real working environment for the first rotor and the second rotor during dynamic balance, and optimizes dynamic balance effect. The motor shaft including the first motor half shaft and the second motor half shaft that are detachably connected is used to help mounting of components such as the rotor, the stator, and an end cover, and reduce mounting process difficulty. When the first motor half shaft and the second motor half shaft are in a connected state, the first motor half shaft and the second motor half shaft are relatively fixed, so that the first motor half shaft and the second motor half shaft can simultaneously rotate. An axial direction of the first motor half shaft is collinear with an axial direction of the second motor half shaft, so that the motor shaft remains balanced when rotating. A detachable connection between the first motor half shaft and the second motor half shaft facilitates maintenance of the axial motor. When a component mounted on the motor shaft is damaged, a corresponding component may be replaced by detaching the first motor half shaft and the second motor half shaft. Therefore, maintenance difficulty and costs of the axial flux motor are reduced.

In a possible implementation, the axial flux motor further includes a fastener, an end plane that is of the first motor half shaft and that faces the second motor half shaft is provided with a fastening groove curved in a direction away from the second motor half shaft, the second motor half shaft is provided with a fastening hole that penetrates the second motor half shaft in the axial direction of the motor shaft, and the fastener passes through the fastening hole and the fastening groove, to detachably connect the first motor half shaft to the second motor half shaft. In this implementation, the fastening groove in the first motor half shaft extends in the axial direction of the motor shaft, and the fastening hole in the second motor half shaft extends in the axial direction of the motor shaft. In this way, the fastener passes through the fastening hole and the fastening groove in a direction perpendicular to a surface of the first motor half shaft or a direction perpendicular to a surface of the second motor half shaft. Therefore, stability of a connection between the fastener and the first motor half shaft and the second motor half shaft may be improved.

In a possible implementation, a limiting part is disposed at an end that is of the fastening hole in the second motor half shaft and that is away from the first motor half shaft. In this implementation, when the fastener passes through the fastening hole, due to blocking of the limiting part on the second motor half shaft, a part of the fastener is inserted into the fastening groove, and a part of the fastener abuts against the limiting part. In this way, the fastener can lock the second motor half shaft and the first motor half shaft in the axial direction.

In a possible implementation, the first motor half shaft includes a first half shaft body and a first frustum, the first frustum is located at an end that is of the first half shaft body and that faces the second motor half shaft, an end plane that is of the second motor half shaft and that faces the first motor half shaft is provided with a first positioning groove curved in a direction away from the first motor half shaft, and the first frustum is located in the first positioning groove and is in interference fit with a groove wall of the first positioning groove. An inner peripheral surface of the first positioning groove matches a shape of an outer peripheral surface of the first frustum, and when the first frustum is inserted into the first positioning groove, the axial direction of the first motor half shaft is collinear with the axial direction of the second motor half shaft, to implement axial positioning of the first motor half shaft and the second motor half shaft, so that the first motor half shaft and the second motor half shaft may further pass through the fastening hole and the fastening groove by using the fastener. The interference fit between the first frustum and the first positioning groove helps eliminate impact of a fit clearance on connection stability and improves overall structural strength of the motor shaft. In this solution, disposing of the first frustum and the first positioning groove ensures coaxiality and a torque transmission capability of the first motor half shaft and the second motor half shaft, and avoids affecting normal operation of the axial flux motor due to segmentation of the motor shaft.

In this implementation, the fastening groove in the first motor half shaft penetrates the first frustum, and the fastening hole in the second motor half shaft penetrates the groove bottom of the first positioning groove. The fastener passes through the fastening groove and the fastening hole, to fasten the first motor half shaft and the second motor half shaft, and the first frustum is in the interfere fit with the first positioning groove, to improve connection stability of the first motor half shaft and the second motor half shaft.

In an implementation, the first motor half shaft and the first frustum are of integrally formed structures, to improve structural strength.

In a possible implementation, an end plane that is of the first motor half shaft and that faces the second motor half shaft is provided with a second positioning groove curved in a direction away from the second motor half shaft, the second motor half shaft includes a second half shaft body and a second frustum, the second frustum is located at an end that is of the second half shaft body and that faces the first motor half shaft, and the second frustum is located in the second positioning groove and is in interference fit with a groove wall of the second positioning groove.

In this implementation, an inner peripheral surface of the second positioning groove matches a shape of an outer peripheral surface of the second frustum, and when the second frustum is inserted into the second positioning groove, the axial direction of the first motor half shaft is collinear with the axial direction of the second motor half shaft, to implement axial positioning of the first motor half shaft and the second motor half shaft, so that the first motor half shaft and the second motor half shaft may pass through the fastening hole and the fastening groove by using the fastener. The interference fit between the second frustum and the second positioning groove helps eliminate impact of a fit clearance on connection stability and improves overall structural strength of the motor shaft. In this solution, disposing of the second frustum and the second positioning groove ensures coaxiality and a torque transmission capability of the first motor half shaft and the second motor half shaft, and avoids negative impact on operation efficiency of the axial flux motor due to segmentation of the motor shaft.

In this implementation, the fastening groove in the first motor half shaft penetrates the groove bottom of the second positioning groove, the fastening hole in the second motor half shaft penetrates the second frustum, the fastener passes through the fastening groove and the fastening hole to fasten the first motor half shaft and the second motor half shaft, and the second frustum is in interference fit with the second positioning groove, to further improve connection stability of the first motor half shaft and the second motor half shaft.

In an implementation, the second motor half shaft and the second frustum are of integrally formed structures, to improve structural strength.

In a possible implementation, the first motor half shaft includes a first half shaft body and a first shaft shoulder located on an outer periphery of the first half shaft body, the double-row angular contact ball bearing is sleeved on the first half shaft body, the first half shaft body has a first rotor mounting position, the first rotor mounting position is used for mounting the first rotor, and the first shaft shoulder is configured to fasten the first rotor; and in the axial direction of the motor shaft, the first shaft shoulder and the first rotor mounting position are located on a side that is of the double-row angular contact ball bearing and that is away from the second motor half shaft. In this implementation, when the double-row angular contact ball bearing and the first rotor are mounted, the double-row angular contact ball bearing is sleeved on the first half shaft body in the axial direction of the motor shaft from an end that is of the first motor half shaft and that is close to the second motor half shaft, and the first rotor is sleeved to the first rotor mounting position in the axial direction of the motor shaft from an end that is of the first motor half shaft and that is away from the second motor half shaft. In this solution, disposing of the first shaft shoulder and the first rotor mounting position clarifies a fastening location of the first rotor on the motor shaft and a mounting sequence of components on the motor shaft.

In a possible implementation, the first shaft shoulder is provided with a first shaft shoulder fastening hole, and the first rotor is fixedly connected to the first shaft shoulder at the first rotor mounting position through the first shaft shoulder fastening hole. In this implementation, the first shaft shoulder fastening hole extends in the axial direction of the motor shaft. Optionally, a fixed connection may be implemented by using a screw, and the screw passes through the first shaft shoulder fastening hole in the axial direction of the motor shaft. In this solution, the first shaft shoulder is disposed to fasten the first rotor. This helps shorten an axial dimension of the axial flux motor while ensuring reliability of a connection between the first rotor and the motor shaft compared with additionally disposing a rotor fastener. In addition, clearance precision between the first rotor and the stator is improved.

In a possible implementation, the first shaft shoulder includes a plurality of first bumps extending in a radial direction of the motor shaft, the plurality of first bumps are sequentially arranged at intervals on the first half shaft body, and the first bumps are fixedly connected to the first rotor. In this implementation, for example, the first bumps are fixedly connected to the first rotor through screws or pins. A quantity of the first bumps may be set based on a requirement. In this solution, it is defined that the first shaft shoulder includes the first bumps, to help reduce manufacturing costs of the motor shaft.

In a possible implementation, the first rotor mounting position is located between the double-row angular contact ball bearing and the first shaft shoulder, and the first shaft shoulder, the first rotor mounting position, and the double-row angular contact ball bearing are sequentially arranged on the motor shaft in the axial direction of the motor shaft. In this implementation, when the double-row angular contact ball bearing and the first rotor are mounted, the first rotor is first sleeved to the first rotor mounting position in the axial direction of the motor shaft from an end that is of the first motor half shaft and that faces toward the second motor half shaft, and then the double-row angular contact ball bearing is sleeved on the first half shaft body in a same manner. The solution defines a location relationship between the first rotor mounting position, the double-row angular contact ball bearing, and the first shaft shoulder. Because a distance between the first rotor mounting position and the double-row angular contact ball bearing is close, a clearance between the first rotor and the stator is small. This helps increase torque, and further reduces the axial dimension of the axial motor.

In a possible implementation, the second motor half shaft includes a second half shaft body and a second shaft shoulder outside the second half shaft body, the second half shaft body has a second rotor mounting position, the second rotor mounting position is used for mounting the second rotor, and the second shaft shoulder is configured to fasten the second rotor; and in the axial direction of the motor shaft, the second shaft shoulder and the second rotor mounting position are located on a side that is of the double-row angular contact ball bearing and that is away from the first motor half shaft. In an implementation, the second shaft shoulder is located between the double-row angular contact ball bearing and the second rotor mounting position. When the second rotor is mounted, the second rotor is sleeved to the second rotor mounting position in the axial direction of the motor shaft from an end that is of the second motor half shaft and that is away from the first motor half shaft. In this solution, disposing of the second shaft shoulder and the second rotor mounting position clarifies a fastening location of the second rotor on the motor shaft.

In a possible implementation, the second shaft shoulder is provided with a second shaft shoulder fastening hole, and the second rotor is fixedly connected to the second shaft shoulder at the second rotor mounting position through the second shaft shoulder fastening hole. The first shaft shoulder fastening hole extends in the axial direction of the motor shaft. Optionally, a fixed connection may be implemented by using a screw, and the screw passes through the first shaft shoulder fastening hole in the axial direction of the motor shaft. In this solution, the second shaft shoulder is disposed to fasten the second rotor. This helps shorten an axial dimension of the axial flux motor while ensuring reliability of a connection between the second rotor and the motor shaft compared with additionally disposing a rotor fastener. In addition, clearance precision between the second rotor and the stator is improved.

In a possible implementation, the second shaft shoulder includes a plurality of second bumps extending in a radial direction of the motor shaft, the plurality of second bumps are sequentially arranged at intervals around the second half shaft body, and the second bumps are fixedly connected to the second rotor. In this implementation, for example, the second bumps are fixedly connected to the second rotor through screws or pins. In this solution, it is defined that the second shaft shoulder includes the second bumps, to help reduce manufacturing costs of the motor shaft.

In a possible implementation, in the axial direction of the motor shaft, the second rotor mounting position is located between the double-row angular contact ball bearing and the second shaft shoulder. When the second rotor is mounted, the second rotor is sleeved to the second rotor mounting position in the axial direction of the motor shaft from an end that is of the second motor half shaft and that faces the first motor half shaft. In this implementation, because a distance between the second rotor mounting position and the double-row angular contact ball bearing is close, a clearance between the second rotor and the stator is small. This helps increase torque and further reduces the axial dimension of the axial motor.

In a possible implementation, a diameter of an end that is of the second motor half shaft and that faces the double-row angular contact ball bearing is larger than a diameter of an end that is of the first half shaft body and that faces the second motor half shaft, the outer periphery of the first half shaft body is further provided with an axial positioning part, and two ends that are of the bearing inner ring and that are located in the axial direction of the motor shaft respectively abut against the second motor half shaft and the axial positioning part. In this solution, the axial positioning part is disposed, and the diameter of the end that is of the second motor half shaft and that faces the double-row angular contact ball bearing is arranged to be larger than the diameter of the end that is of the first half shaft body and that faces the second motor half shaft, so that the two ends that are of the bearing inner ring of the double-row angular contact ball bearing and that are located in the axial direction of the motor shaft respectively abut against the second motor half shaft and the axial positioning part. This avoids a phenomenon of deviation and dislocation between the bearing inner ring and the first motor half shaft and the second motor half shaft. In addition, the axial positioning part is disposed in the motor shaft, so that there is no need to use a nut for a fixed connection. Therefore, a structure of the motor shaft is simplified, and mounting and disassembly are more convenient.

In a possible implementation, the axial flux motor further includes the first rotor, the first rotor is sleeved on the motor shaft and is fixedly connected to the motor shaft, a surface that is of the first rotor and that is away from the stator has a first rotor groove curved in a direction facing the stator, and the motor shaft passes through the first rotor groove. In this solution, the first rotor groove is disposed, so that remaining components may be mounted on the motor shaft corresponding to the first rotor groove. This provides space in the axial direction for the remaining components to be mounted on the motor shaft, and helps reduce the axial dimension of the axial motor.

In a possible implementation, the first rotor includes a rotor back plane, the rotor back plane is configured to be sleeved on the motor shaft of the axial motor, the first rotor groove is located on a surface that is of the rotor back plane and that is away from the stator, and the first rotor groove is curved in a direction facing the stator. In this implementation, an axis of the rotor back plane coincides with an axis of the motor shaft, an axial direction of the rotor back plane coincides with the axial direction of the motor shaft, and an extension direction of the axis of the rotor back plane is the axial direction of the rotor back plane, where a radial direction of the rotor back plane is the same as the radial direction of the motor shaft. In this implementation, the rotor back plane is of a ring-shaped structure.

In a possible implementation, a magnetic pole accommodating groove is disposed on a surface that is of the rotor back plane and that faces the stator, and the magnetic pole accommodating groove is configured to accommodate a magnetic pole component in the stator, where the magnetic pole accommodating groove surrounds an outer periphery of the first rotor groove in the radial direction of the motor shaft. In this solution, the magnetic pole accommodating groove is defined. This helps fasten the magnetic pole component, and avoids affecting performance of the magnetic pole component. Therefore, mounting accuracy and operation efficiency of the first rotor are improved.

In a possible implementation, the bottom of the first rotor groove is provided with a back plane fastening hole, and the first rotor is fastened to the first motor half shaft at the first rotor mounting position through the first shaft shoulder fastening hole and the back plane fastening hole. The back plane fastening hole extends in the axial direction of the motor shaft. Optionally, a fixed connection may be implemented by using a screw, and the screw passes through the first shaft shoulder fastening hole and the back plane fastening hole in the axial direction of the motor shaft. In this solution, disposing of the back plane fastening hole helps improve stability of a connection between the first rotor and the motor shaft.

In a possible implementation, the axial flux motor further includes the second rotor, the second rotor is sleeved on the motor shaft and is fixedly connected to the motor shaft, a surface that is of the second rotor and that is away from the stator has a second rotor groove curved in a direction facing the stator, and the motor shaft passes through the second rotor groove. The first rotor and the second rotor are located on both sides of the stator in the axial direction of the motor shaft, and cooperation of the first rotor and the second rotor helps improve operation efficiency of the axial motor. In this solution, the second rotor groove is disposed, so that a component on a side that is of the second rotor and that is away from the stator may be accommodated in the second rotor groove. For example, a second end cover bearing may be disposed in the second rotor groove, to further reduce the axial dimension of the axial motor.

In a possible implementation, the second rotor includes a rotor back plane, the second rotor groove is located on a surface that is of the rotor back plane of the second rotor and that faces the stator, and the rotor back plane of the second rotor is provided with a magnetic pole accommodating groove, where the magnetic pole accommodating groove is configured to accommodate a magnetic pole component, and the magnetic pole accommodating groove is located on an outer peripheral side of the second rotor groove. In this solution, the magnetic pole accommodating groove is defined. This helps fasten the magnetic pole component, and avoids affecting performance of the magnetic pole component. Therefore, mounting accuracy and operation efficiency of the second rotor are improved.

In a possible implementation, the axial flux motor further includes a first end cover and a first end cover bearing, the first end cover is rotatably connected to the motor shaft through the first end cover bearing, and a part of the first end cover bearing is located in the first rotor groove. In this implementation, when the first end cover bearing is mounted on the motor shaft, an axial direction of the first end cover bearing is the same as the axial direction of the motor shaft. Optionally, the first end cover bearing may be a deep groove ball bearing. In this solution, it is defined that a part of the first end cover bearing of the limit part is located in the first rotor groove, and a projection of the first end cover bearing on the motor shaft in the radial direction of the motor shaft overlaps a projection part of the first rotor on the motor shaft in the radial direction of the motor shaft. In this way, the first end cover bearing may be arranged closer to the inside of the axial flux motor in the axial direction of the motor shaft, and an axial dimension occupied by the first end cover bearing is reduced. Therefore, space utilization of the motor shaft in the axial direction is effectively improved, and an overall structure of the axial flux motor is more compact.

In a possible implementation, the first end cover includes a first end cover mounting hole, and one end of the motor shaft passes through the first end cover mounting hole and is mounted inside the axial motor. An axial direction of the first end cover coincides with the axial direction of the motor shaft. In this solution, disposing of the first end cover mounting hole facilitates mounting of the first end cover on the motor shaft.

In a possible implementation, the first end cover bearing includes a first end cover bearing inner ring and a first end cover bearing outer ring that are rotatably connected, the first end cover bearing inner ring is fixedly connected to the motor shaft, and the first end cover bearing outer ring is fixedly connected to the first end cover. In this solution, the first end cover bearing inner ring and the first end cover bearing outer ring are arranged, so that the stator and the first end cover remain stationary when the axial flux motor is in operation, and the motor shaft rotates synchronously with the first rotor and the second rotor.

In a possible implementation, the axial flux motor further includes a second end cover and a housing, the housing is located outside the stator, the first end cover and the second end cover are fastened to the housing and form accommodating space with the housing, and the double-row angular contact ball bearing, the stator, the first rotor, and the second rotor are located in the accommodating space. In this solution, the second end cover and the housing are disposed, and the first end cover, the second end cover, and the housing isolate the accommodating space from an external environment, to prevent an internal component of the axial flux motor from damage of the external environment.

In a possible implementation, the second end cover rotates to the motor shaft through the second end cover bearing, and at least a part of the second end cover bearing is located in the second rotor groove. This solution helps reduce the axial dimension of the axial motor.

In a possible implementation, a surface that is of the second end cover and that is away from the stator is flush. In this implementation, the center of the second end cover has a mounting component and another component, for example, a resolver. The mounting component and the another component may be disposed in the second rotor groove. In this way, the surface that is of the second end cover and that is away from the stator is flush, to reduce a dimension of the axial motor. The resolver is configured to monitor a rotation speed and a location of the axial motor.

According to a second aspect, an embodiment of this application provides a powertrain, including a gearbox and the axial flux motor according to any implementation of the first aspect. The axial flux motor is transmittingly connected to a power input shaft of the gearbox, and the axial flux motor is configured to output power to the power input shaft. In this solution, the axial flux motor in any implementation of the first aspect is used in the powertrain. Because the axial flux motor has advantages such as high durability and low mounting difficulty, overall operation efficiency and stability of the powertrain are ensured.

According to a third aspect, an embodiment of this application provides an electric device, where the electric device includes a device body and the axial flux motor according to any implementation of the first aspect, and the axial flux motor is mounted on the device body. Alternatively, the electric device includes a device body and the powertrain according to the second aspect, and the powertrain is mounted on the device body. In this solution, the powertrain described in the second aspect is used in the electric device. This helps the electric device use power stably transmitted by the powertrain, and prolongs a service life of the electric device.

BRIEF DESCRIPTION OF DRAWINGS

To describe technical solutions in embodiments of this application more clearly, the following describes the accompanying drawings used in embodiments of this application.

DESCRIPTION OF EMBODIMENTS

Figure 1:
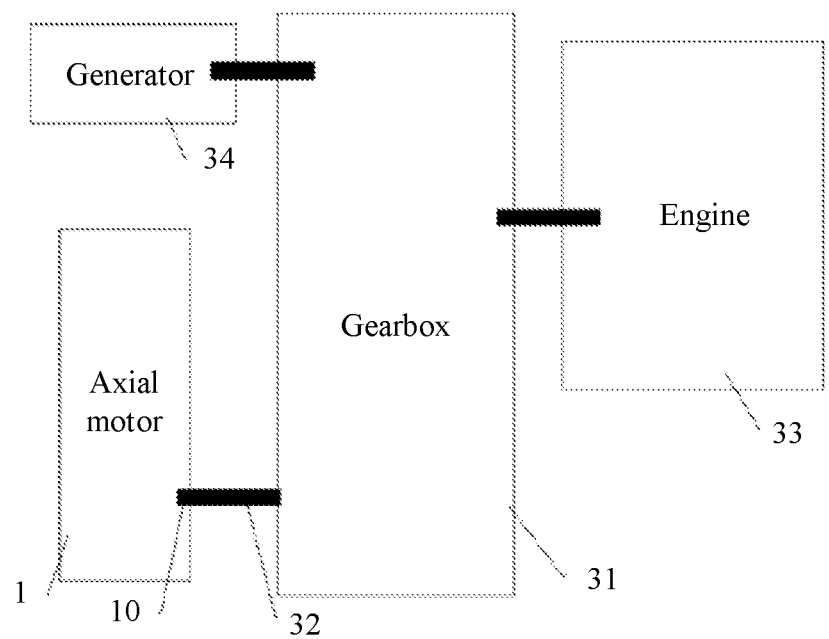
FIG. 1 is a schematic diagram of a structure of a powertrain according to an embodiment of this application.

The following describes the technical solutions in embodiments of this application with reference to the accompanying drawings in embodiments of this application. It is clear that the described embodiments are merely a part rather than all of embodiments of this application.

The terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In addition, in this specification, position terms such as "top" and "bottom" are defined relative to positions of structures in the accompanying drawings. It should be understood that these position terms are relative concepts used for relative description and clarification, and may correspondingly change according to changes in the positions of the structures.

For ease of understanding, the following first explains and describes English abbreviations and related technical terms used in embodiments of this application.

An outer circumferential surface refers to an outer surface surrounding a circumferential direction of a component.

An inner circumferential surface refers to an inner surface surrounding the circumferential direction of the component.

This application provides an axial motor, and the axial flux motor includes a motor shaft, a double-row angular contact ball bearing, and a stator. The double-row angular contact ball bearing includes a bearing inner ring and a bearing outer ring that are rotatably connected, the double-row angular contact ball bearing is sleeved on the motor shaft, and the bearing inner ring is fixedly connected to the motor shaft. The stator is sleeved on the motor shaft through the double-row angular contact ball bearing, and the stator is fixedly connected to the bearing outer ring, so that the motor shaft can rotate relative to the stator. In this application, the double-row angular contact ball bearing is used in the axial motor, and due to a strong axial bearing capability of the double-row angular contact ball bearing, the double-row angular contact ball bearing can bear axial force generated through interaction between the stator and a rotor, to protect the double-row angular contact ball bearing from damage of the axial force. Therefore, durability of the axial flux motor is improved. In addition, because a clearance of the double-row angular contact ball bearing is usually not adjustable, and different models of double-row angular contact ball bearings have different clearances, the stator and the motor shaft may be adapted by selecting the models, and there is no need to manually adjust a bearing clearance. Therefore, mounting difficulty is effectively reduced, and production efficiency is improved.

Figure 2:
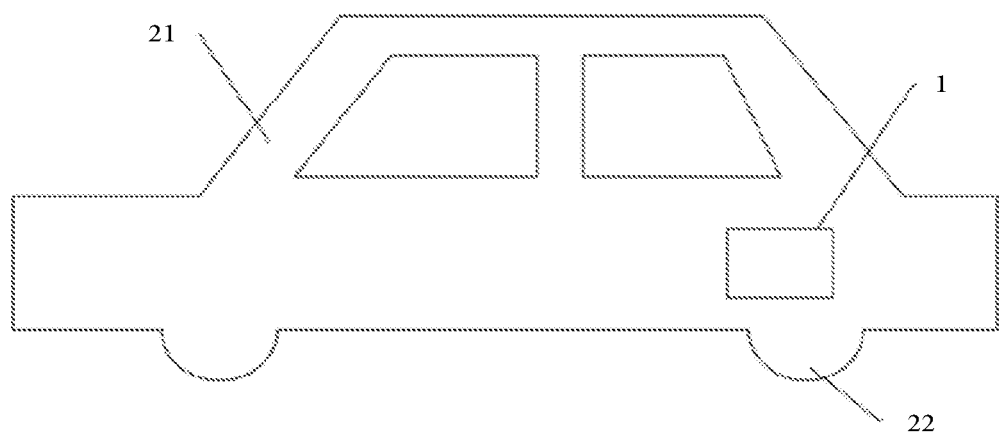
FIG. 2 is a schematic diagram of a structure of an electric device according to an embodiment of this application.

Refer to FIG. 1 and FIG. 2. FIG. 1 is a schematic diagram of a structure of a powertrain according to an embodiment of this application, and FIG. 2 is a schematic diagram of a structure of an electric device according to an embodiment of this application. An axial flux motor 1 provided in this application can be applied to an electric device 2 or a powertrain 3, and the powertrain 3 that includes the axial flux motor 1 of this application can also be applied to the electric device 2.

In an embodiment, the powertrain 3 includes a gearbox 31 and the axial flux motor 1 (as shown in FIG. 1), the axial flux motor 1 is in transmittingly connected to a power input shaft 32 of the gearbox 31, and the axial flux motor 1 is configured to output power to the power input shaft 32. In this embodiment, the gearbox 31 and the axial flux motor 1 in the powertrain 3 may be separated or integrated. A motor shaft 10 of the axial flux motor 1 is fixedly connected to the power input shaft 32 of the gearbox 31, so that power of the axial flux motor 1 is transmitted to the power input shaft 32.

In a possible implementation, a wheel drive shaft (not shown in the figure) is disposed in the gearbox 31, and the wheel drive shaft supplies power to a wheel after receiving power output by the axial flux motor 1. In this implementation, the gearbox 31 is provided with a gear component to transmit power from the axial flux motor 1 to the wheel drive shaft.

In a possible implementation, the powertrain 3 further includes an engine 33 and a generator 34. The engine 33 is transmittingly connected to another power input shaft in the gearbox 31, and is configured to output power to the another power input shaft. The generator 34 is transmittingly connected to the engine 33 through the gear component in the gearbox 31. Power output by the engine 33 is transmitted to the generator 34 through the gearbox 31, and the generator 34 generates electricity and stores electric energy in a power battery to charge the power battery. It should be noted that, the powertrain 3 provided in FIG. 1 includes the engine 33 and the generator 34, and the powertrain 3 is a hybrid power system. In some implementations, the engine 33 and the generator 34 may not be disposed in the powertrain 3, and only the axial flux motor 1 and the gearbox 31 are included. In this case, the powertrain 3 is a pure electric powertrain.

In a possible implementation, the powertrain 3 further includes at least one of a motor control unit (MCU), an on-board charger (OBC), a direct-current to direct-current (DC-DC) converter, a power distribution unit (PDU), and a battery control unit (BCU). The powertrain 3 may integrate at least one of the foregoing components based on a requirement.

Refer to FIG. 2. In an embodiment, the electric device 2 includes a device body 21 and the axial flux motor 1, and the axial flux motor 1 is mounted on the device body 21. Alternatively, the electric device 2 includes a device body 21 and the powertrain 3, and the powertrain 3 is mounted on the device body 21.

The electric device 2 includes a vehicle, a robot, or another form of driving device, where the vehicle includes an electric vehicle (EV), a pure electric vehicle/battery electric vehicle (PEV/BEV), a hybrid electric vehicle (HEV), a range-extended electric vehicle (REEV), a plug-in hybrid vehicle (PHEV), a new energy vehicle, and the like. In some implementations, the vehicle includes a passenger vehicle and various special purpose vehicles having specific functions, for example, an engineering rescue vehicle, a sprinkler, a sewage suction vehicle, a cement mixer vehicle, a crane vehicle, a medical vehicle, and the like.

For example, as shown in FIG. 2, the electric device 2 is a vehicle, and the electric device 2 further includes a wheel 22, where the wheel 22 is mounted on the device body 21, the axial flux motor 1 is transmittingly connected to the wheel 22, and the axial flux motor 1 is configured to drive the wheel 22 to rotate, to drive the vehicle to travel.

The following provides a detailed description on the axial flux motor of this application.

Figure 3:
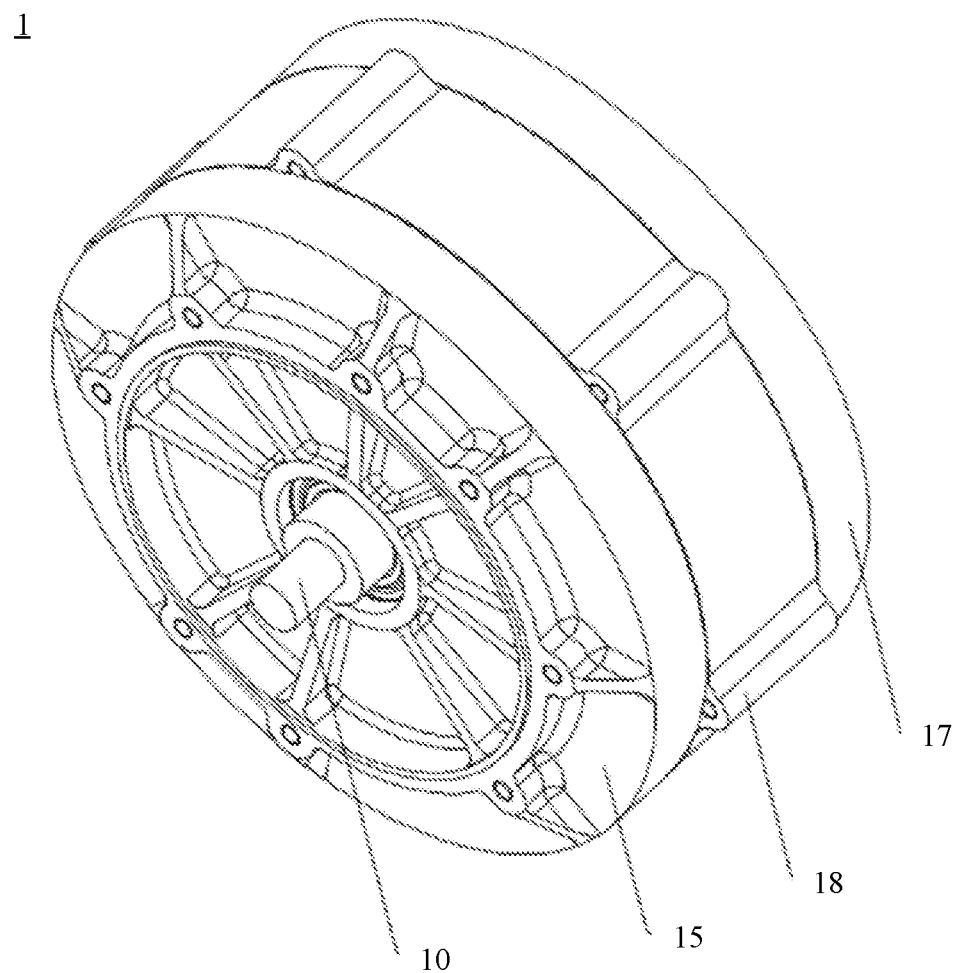
FIG. 3 is a schematic diagram of a structure of an axial flux motor according to an embodiment of this application.
Figure 4:
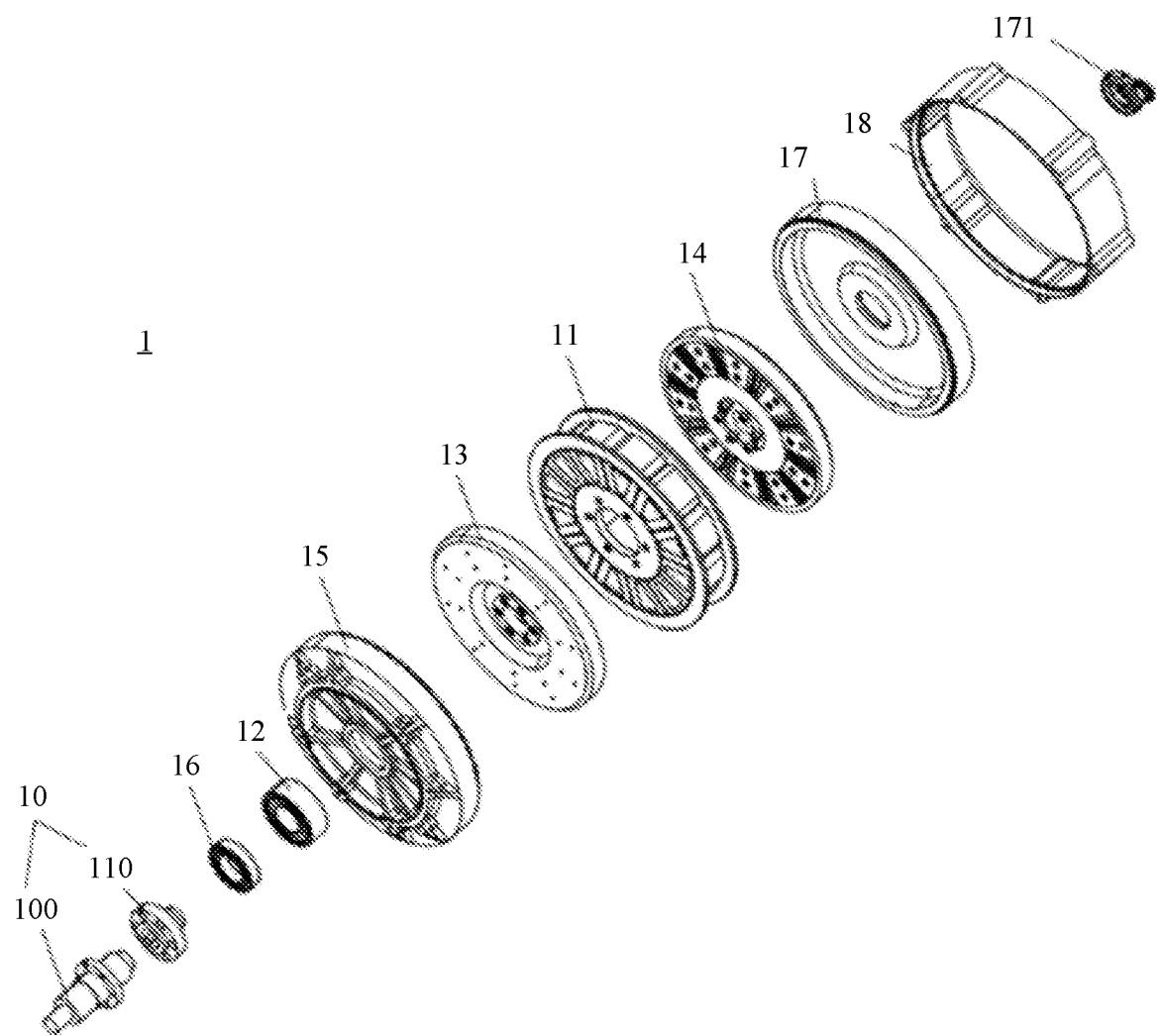
FIG. 4 is an exploded view of an axial flux motor according to an embodiment of this application.
Figure 5:
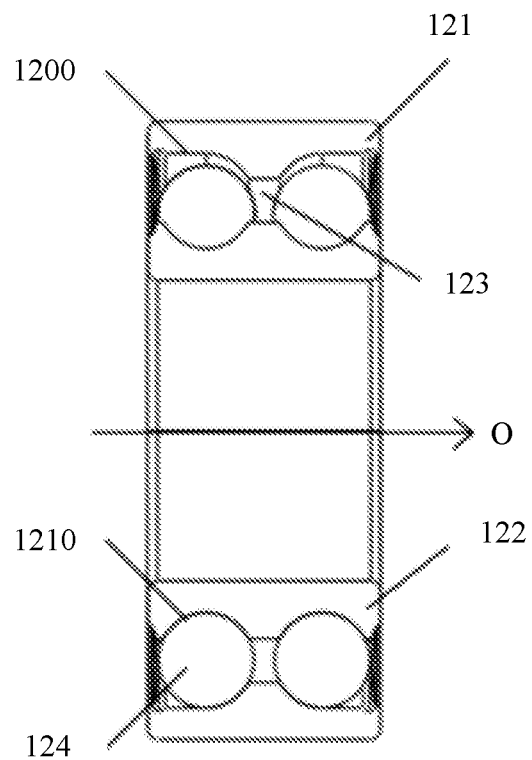
FIG. 5 is a cross-sectional view of a double-row angular contact ball bearing in an axial flux motor according to an embodiment of this application.

Refer to FIG. 3 to FIG. 5. FIG. 3 is a schematic diagram of a structure of the axial flux motor 1 according to an embodiment of this application, FIG. 4 is an exploded view of the axial flux motor 1 according to an embodiment of this application, and FIG. 5 is a cross-sectional view of a double-row angular contact ball bearing 12 according to an embodiment of this application.

An embodiment of this application provides the axial flux motor 1. The axial flux motor 1 includes a motor shaft 10, a stator 11, and the double-row angular contact ball bearing 12 (as shown in FIG. 3 and FIG. 4). The double-row angular contact ball bearing 12 includes a bearing outer ring 121 and a bearing inner ring 122 that are rotatably connected (as shown in FIG. 5), the double-row angular contact ball bearing 12 is sleeved on the motor shaft 10, and the bearing inner ring 122 is fixedly connected to the motor shaft 10. The stator 11 is sleeved on the motor shaft 10 through the double-row angular contact ball bearing 12, and the stator 11 is fixedly connected to the bearing outer ring 121, so that the motor shaft 10 can rotate relative to the stator 11.

The double-row angular contact ball bearing 12 is a bearing that can bear a radial load and axial loads acting in two directions. A model and a contact angle of the double-row angular contact ball bearing 12 may be selected based on a requirement, for example, based on design parameters of the stator 11 and a rotor in the axial flux motor 1, so that the double-row angular contact ball bearing 12 can be adapted to the axial flux motor 1.

The bearing inner ring 122 and the bearing outer ring 121 are rotatably connected, so that the bearing inner ring 122 can rotate relative to the bearing outer ring 121. In this embodiment, the motor shaft 10 is fixedly connected to the bearing inner ring 122, the motor shaft 10 may be clamped into the bearing inner ring 122 and fastened relative to the bearing inner ring 122, and the stator 11 is sleeved on the bearing outer ring 121 and fastened relative to the bearing outer ring 121. In this way, the motor shaft 10 and the bearing inner ring 122 can rotate relative to the bearing outer ring 121 and the stator 11.

Refer to FIG. 5. In an implementation, the double-row angular contact ball bearing 12 further includes a double-row cage 123 and a plurality of balls 124. The double-row cage 123 is of a ring-shaped structure coaxially and parallelly disposed between the bearing outer ring 121 and the bearing inner ring 122. The double-row cage 123 is provided with a plurality of cage pockets (not shown in the figure). The balls 124 are movably arranged in each cage pocket. An inner circumferential surface of the bearing outer ring 121 is provided with two parallel first raceways 1200, an outer circumferential surface of the bearing inner ring 122 is provided with two parallel second raceways 1210, and the two first raceways 1200 one-to-one correspond to the two second raceways 1210. A shape of the balls 124 is matched with the first raceways 1200 and the second raceways 1210, and the balls 124 are disposed between the first raceways 1200 and the second raceways 1210. When the double-row angular contact ball bearing 12 is mounted on the motor shaft 10, an axial direction O of the double-row angular contact ball bearing 12 coincides with an axial direction of the motor shaft 10. A bearing clearance of the double-row angular contact ball bearing 12 is fixed, and the double-row angular contact ball bearing 12 can bear bidirectional axial loads. Compared with a case in which two-single row angular contact ball bearings are directly used on the motor shaft 10, using the double-row angular contact ball bearing 12 occupies a smaller dimension in the axial direction of the motor shaft 10 and provides better rigidity.

In an implementation, the stator 11 may be a centralized winding stator or a distributed winding stator. The centralized winding stator refers to a plurality of stator cores distributed around the motor shaft 10, and a winding is wound on each stator core to form a centralized winding. The stator 11 shown in FIG. 4 is the centralized winding stator. The distributed winding stator refers to a stator core that integrally surrounds the motor shaft 10, where the stator core is of an integral structure, and then a winding groove is stamped on the stator core and a winding is wound in the winding groove, to form a distributed winding.

In an implementation, the axial flux motor 1 further includes at least one first rotor 13 (as shown in FIG. 4), and the first rotor 13 is fixedly connected to the motor shaft 10. When an alternating current is input to an armature winding of the stator 11, a generated alternating magnetic flux interacts with a permanent magnet magnetic flux generated by the first rotor 13, to enable the first rotor 13 to rotate relative to the stator 11. The first rotor 13 is fixedly connected to the motor shaft 10, so that the motor shaft 10 rotates with the first rotor 13, and the stator 11 is rotatably connected to the motor shaft 10, so that the motor shaft 10 can rotate relative to the stator 11. When the axial flux motor 1 is in operation, the stator 11 does not move, and the first rotor 13 and the motor shaft 10 rotate synchronously. An output end of the motor shaft 10 is configured to drive an external component to rotate.

In this implementation, when the axial flux motor 1 includes one rotor, effect of magnetic force of attraction between the rotor and the stator 11 enables the rotor to approach the stator 11. When the axial flux motor 1 includes two rotors, force on both sides of the motor shaft 10 is different due to different mounting precision or asymmetric air gap dimensions between the two rotors and the motor shaft 10 and the stator 11. In the foregoing two cases, a bearing between the rotor and the stator 11 is subject to axial force. In this case, the bearing between the rotor and the stator 11 is easily damaged. Therefore, performance of the axial flux motor 1 is further affected.

In this embodiment of this application, the double-row angular contact ball bearing 12 is used in the axial flux motor 1, and due to a strong axial bearing capability of the double-row angular contact ball bearing 12, the double-row angular contact ball bearing 12 can bear an axial load generated through interaction between the stator 11 and the rotor, to protect the double-row angular contact ball bearing 12 from damage of the axial force. Therefore, durability of the axial flux motor 1 is improved. In addition, because a clearance of the double-row angular contact ball bearing 12 is usually not adjustable, and different models of double-row angular contact ball bearings 12 have different clearances, the stator 11 and the motor shaft 10 may be adapted by selecting the models, and there is no need to manually adjust a bearing clearance. Therefore, mounting difficulty and costs are effectively reduced.

Figure 6:
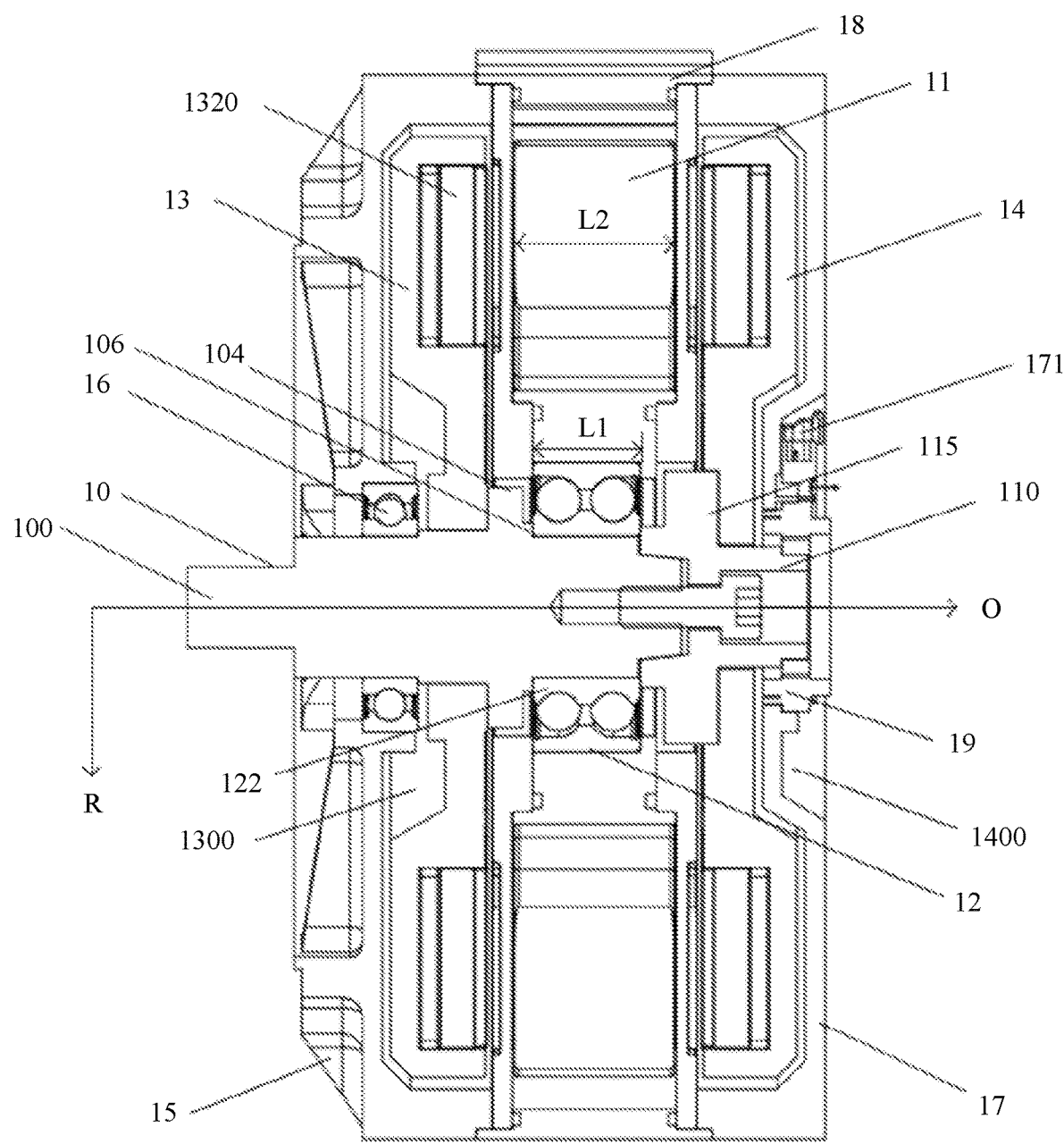
FIG. 6 is a cross-sectional view of an axial flux motor according to an embodiment of this application.

FIG. 6 is a cross-sectional view of the axial flux motor 1 according to an embodiment of this application. In a possible implementation, a dimension of the double-row angular contact ball bearing 12 in an axial direction O of the motor shaft 10 is smaller than a dimension of the stator 11 in the axial direction O of the motor shaft 10. The dimension of the stator 11 in the axial direction O of the motor shaft 10 is an axial dimension between two ends of the stator 11 in the axial direction O. In some implementations, the dimension of the stator 11 in the axial direction O of the motor shaft 10 is an axial dimension of a stator component that includes a stator core and a stator winding in the stator 11 in the axial direction of the motor shaft 10. As shown in FIG. 6, the dimension of the double-row angular contact ball bearing 12 in the axial direction O of the motor shaft 10 is L1, the dimension of the stator 11 in the axial direction O of the motor shaft 10 is L2, and L1 is smaller than L2.

In this solution, a dimension relationship between the dimension of the double-row angular contact ball bearing 12 in the axial direction O of the motor shaft 10 and the dimension of the stator 11 in the axial direction O of the motor shaft 10 is defined, to reduce a dimension of the motor shaft 10 occupied by the double-row angular contact ball bearing 12. In this way, space for another component to be mounted on the motor shaft 10 is provided, and utilization of internal space of the axial flux motor 1 is improved. Therefore, an axial dimension of the motor shaft 10 is reduced, and an axial dimension of the axial flux motor 1 is further reduced.

In an implementation, a projection of the stator 11 on the motor shaft 10 in a radial direction R of the motor shaft 10 completely covers a projection of the double-row angular contact ball bearing 12 on the motor shaft 10 in the radial direction R of the motor shaft 10. In this implementation, a given space distance between the two ends of the stator 11 in the axial direction O of the motor shaft 10 and two ends of the double-row angular contact ball bearing 12 in the axial direction O of the motor shaft 10 is provided, so that the another component on the motor shaft 10 may be located between an end of the stator 11 and an end of the double-row angular contact ball bearing 12. Therefore, mounting of components on the motor shaft 10 is more compact, and the axial dimension of the axial flux motor 1 is reduced.

In an implementation, there is an air gap between that the stator 11 and the first rotor 13, and when an axial dimension of the double-row angular contact ball bearing 12 is small, a first shaft shoulder 104 and a second shaft shoulder 115 of the motor shaft 10 may be disposed close to the inside of the stator 11, to further reduce a dimension of an air gap between the stator 11 and the first rotor 13 and a second rotor 14. This helps increase torque and reduces the axial dimension of the axial flux motor 1.

Figure 7:
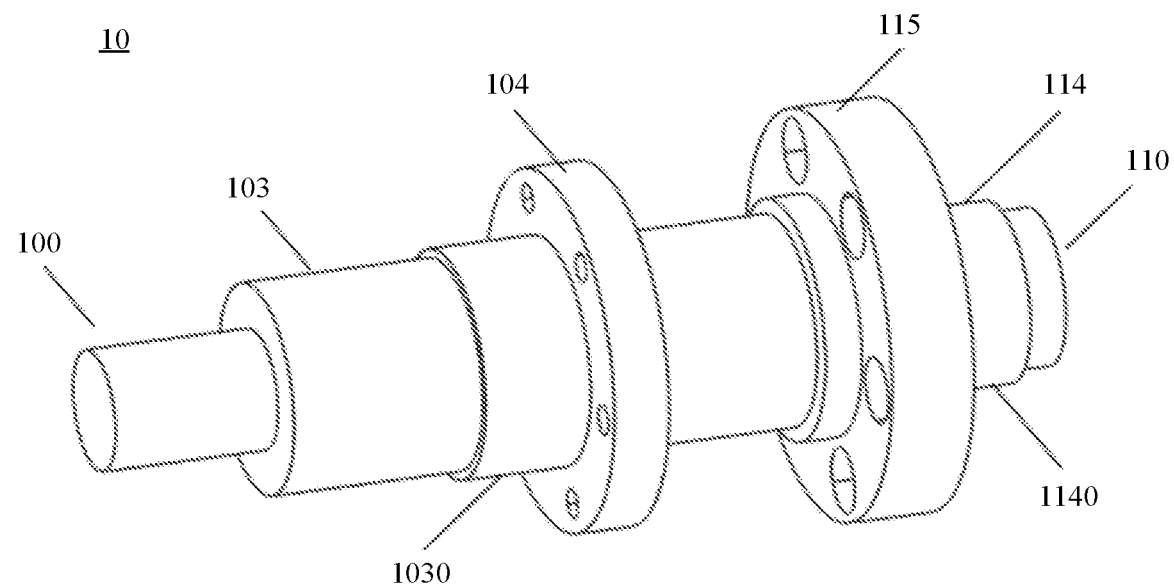
FIG. 7 is a schematic diagram of a structure of a motor shaft in an axial flux motor according to an embodiment of this application.
Figure 8:
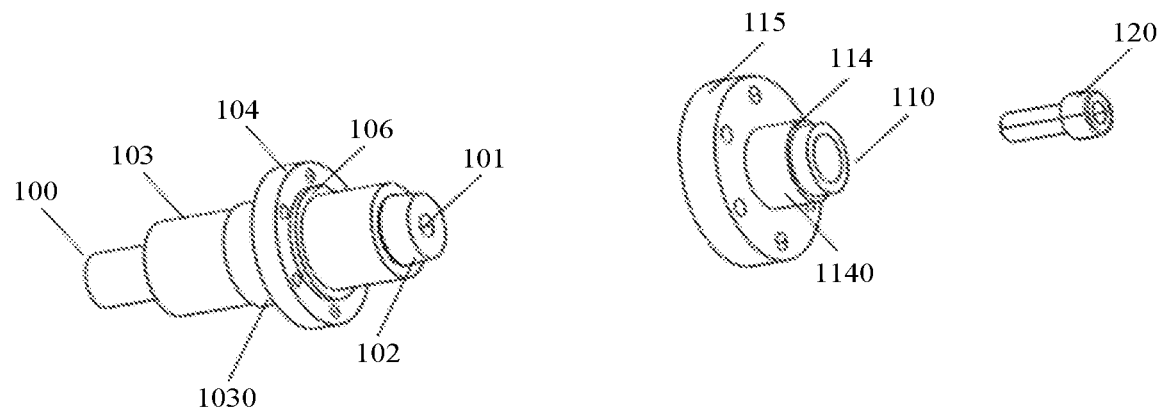
FIG. 8 is an exploded view of a first motor half shaft and a second motor half shaft according to an embodiment of this application.

Refer to FIG. 6, FIG. 7, and FIG. 8. FIG. 7 is a schematic diagram of a structure of the motor shaft 10 in the axial flux motor 1 according to an embodiment of this application, and FIG. 8 is an exploded view of a first motor half shaft 100 and a second motor half shaft 110 according to an embodiment of this application.

In a possible implementation, the motor shaft 10 includes the first motor half shaft 100 and the second motor half shaft 110 that are arranged in the axial direction O of the motor shaft 10 (as shown in FIG. 6). The first motor half shaft 100 and the second motor half shaft 110 are detachably connected. The first motor half shaft 100 is used for mounting the first rotor 13 and the double-row angular contact ball bearing 12 (as shown in FIG. 6), and the second motor half shaft 110 is used for mounting the second rotor 14 (as shown in FIG. 6).

The first motor half shaft 100 and the second motor half shaft 110 are detachably connected. When the first motor half shaft 100 and the second motor half shaft 110 are in a detached state (as shown in FIG. 8), the first motor half shaft 100 and the second motor half shaft 110 may be respectively used to perform a dynamic balance test with the first rotor 13 and the second rotor 14. This helps restore a real working environment for the first rotor 13 and the second rotor 14 during dynamic balance, and optimizes dynamic balance effect. For example, the first rotor 13 is mounted on the first motor half shaft 100, and the first motor half shaft 100 and the first rotor 13 rotate as a whole to perform dynamic balance correction, so that the whole including the first motor half shaft 100 and the first rotor 13 can implement dynamic balance effect when rotating. The second rotor 14 is mounted on the second motor half shaft 110, and the second motor half shaft 110 and the second rotor 14 rotates as a whole to perform dynamic balance correction, so that the whole including the second motor half shaft 110 and the second rotor 14 can implement the dynamic balance effect when rotating. When the motor shaft 10 with an integral structure is used, if the first rotor 13 and the second rotor 14 are simultaneously mounted on the motor shaft 10 to implement dynamic balance, variables of the first rotor 13, the second rotor 14 and the motor shaft 10 increase, and difficulty of dynamic balance is increased. In addition, when the first rotor 13 and the second rotor 14 are mounted on the motor shaft 10, the stator 11 cannot be mounted, and if a component such as the stator 11 is mounted on the motor shaft 10 at the same time to implement dynamic balance, the dynamic balance test cannot be completed. When the first rotor 13 and the second rotor 14 are mounted on a fake motor shaft 10 to implement dynamic balance, because the fake motor shaft 10 is different from the actual motor shaft 10, the dynamic balance is deviated. In this implementation, the motor shaft 10 including the first motor half shaft 100 and the second motor half shaft 110 that are detachably connected facilitates dynamic balance correction of the motor shaft 10, and finally improves the dynamic balance effect. In addition, the motor shaft 10 including the first motor half shaft 100 and the second motor half shaft 110 that are detachably connected is used to help mounting of components such as the rotor, the stator, and an end cover, and reduce mounting process difficulty.

When the first motor half shaft 100 and the second motor half shaft 110 are in a connected state (as shown in FIG. 7), the first motor half shaft 100 and the second motor half shaft 110 are relatively fixed, so that the first motor half shaft 100 and the second motor half shaft 110 can simultaneously rotate. An axial direction of the first motor half shaft 100 is collinear with an axial direction of the second motor half shaft 110, so that the motor shaft 10 remains balanced when rotating. A detachable connection between the first motor half shaft 100 and the second motor half shaft 110 facilitates maintenance of the axial flux motor 1. When a component mounted on the motor shaft 10 is damaged, a corresponding component may be replaced by detaching the first motor half shaft 100 and the second motor half shaft 110. Therefore, maintenance difficulty and costs of the axial flux motor 1 are reduced.

Figure 9:
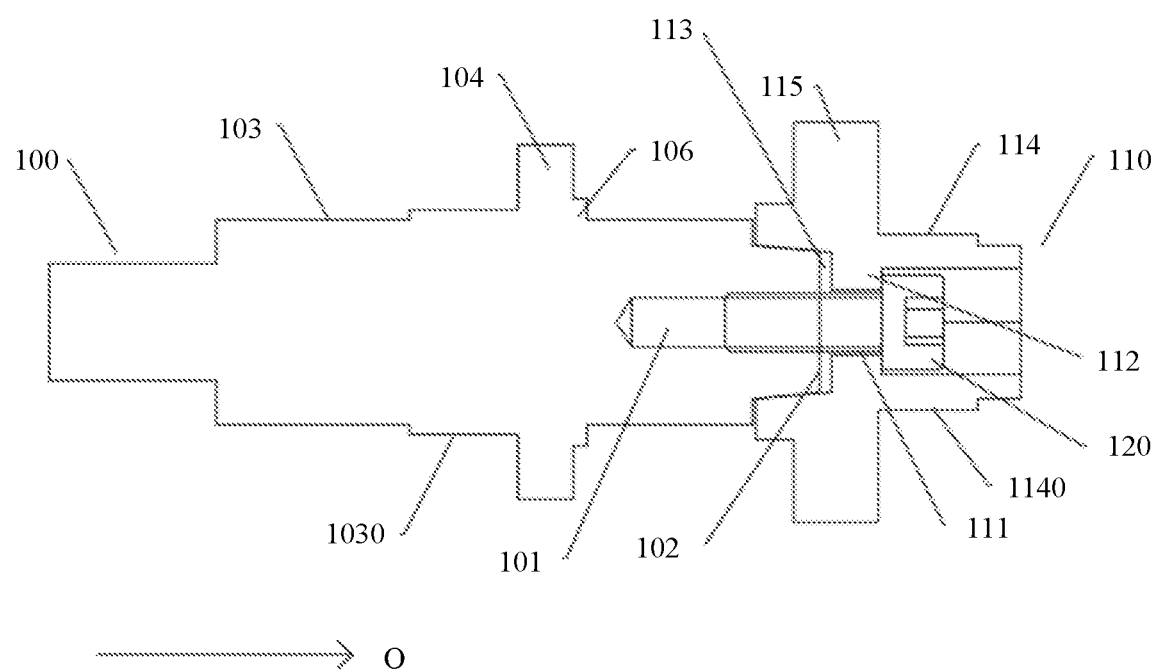
FIG. 9 is a cross-sectional view of a motor shaft in an axial flux motor according to an embodiment of this application.

FIG. 9 is a cross-sectional view of the motor shaft 10 in the axial flux motor 1 according to an embodiment of this application. In a possible implementation, the axial flux motor 1 further includes a fastener 120, an end plane that is of the first motor half shaft 100 and that faces the second motor half shaft 110 is provided with a fastening groove 101 curved in a direction away from the second motor half shaft 110, the second motor half shaft 110 is provided with a fastening hole 111 that penetrates the second motor half shaft 110 in the axial direction O of the motor shaft 10, and the fastener 120 passes through the fastening hole 111 and the fastening groove 101, to detachably connect the first motor half shaft 100 to the second motor half shaft 110. In this implementation, the fastening groove 101 in the first motor half shaft 100 extends in the axial direction O of the motor shaft 10, and the fastening hole 111 in the second motor half shaft 110 extends in the axial direction O of the motor shaft 10. In this way, the fastener 120 passes through the fastening hole 111 and the fastening groove 101 in a direction perpendicular to a surface of the first motor half shaft 100 or a direction perpendicular to a surface of the second motor half shaft 110. Therefore, stability of a connection between the fastener 120 and the first motor half shaft 100 and the second motor half shaft 110 may be improved.

In an implementation, the fastener 120 is a screw, a bolt, or the like. For example, when the fastener 120 is the screw, the second motor half shaft 110 is locked to the first motor half shaft 100 through the screw, to improve structural reliability of the first motor half shaft 100 and the second motor half shaft 110.

In an implementation, a limiting part 112 is disposed at an end that is of the fastening hole 111 in the second motor half shaft 110 and that is away from the first motor half shaft 100 (as shown in FIG. 9). When the fastener 120 passes through the fastening hole 111, due to blocking of the limiting part 112 on the second motor half shaft 110, a part of the fastener 120 is inserted into the fastening groove 101, and a part of the fastener 120 abuts against the limiting part 112, so that the fastener 120 can lock the second motor half shaft 110 and the first motor half shaft 100 in the axial direction O.

In a possible implementation, the first motor half shaft 100 includes a first frustum 102 and a first half shaft body 103, the first frustum 102 is located at an end that is of the first half shaft body 103 and that faces the second motor half shaft 110 (as shown in FIG. 9), an end plane that is of the second motor half shaft 110 and that faces the first motor half shaft 100 is provided with a first positioning groove 113 curved in a direction away from the first motor half shaft 100 (as shown in FIG. 9), and the first frustum 102 is located in the first positioning groove 113 and is in interference fit with a groove wall of the first positioning groove 113.

An inner peripheral surface of the first positioning groove 113 matches a shape of an outer peripheral surface of the first frustum 102. When the first frustum 102 is inserted into the first positioning groove 113, the axial direction O of the first motor half shaft 100 is collinear with the axial direction O of the second motor half shaft 110, to implement axial positioning of the first motor half shaft 100 and the second motor half shaft 110, so that the first motor half shaft 100 and the second motor half shaft 110 may pass through the fastening hole 111 and the fastening groove 101 by using the fastener 120. The interference fit between the first frustum 102 and the first positioning groove 113 helps eliminate impact of a fit clearance on connection stability, and improves overall structural strength of the motor shaft 10. In this solution, disposing of the first frustum 102 and the first positioning groove 113 ensures coaxiality and a torque transmission capability of the first motor half shaft 100 and the second motor half shaft 110, and avoids negative impact on operation efficiency of the axial flux motor 1 due to segmentation of the motor shaft 10.

In this implementation, the first frustum 102 is a truncated cone. In some other implementations, the first frustum 102 may be a triangular cone, a triangular pyramid, a square pyramid, or the like, and an inner wall of the first positioning groove 113 of the second motor half shaft 110 needs to be correspondingly arranged to match a shape of the first frustum 102 of the first motor half shaft 100.

In this implementation, the fastening groove 101 in the first motor half shaft 100 penetrates the first frustum 102, the fastening hole 111 in the second motor half shaft 110 penetrates the groove bottom of the first positioning groove 113, the fastener 120 passes through the fastening groove 101 and the fastening hole 111 to fasten the first motor half shaft 100 and the second motor half shaft 110, and the first frustum 102 is in interference fit with the first positioning groove 113, to improve connection stability of the first motor half shaft 100 and the second motor half shaft 110.

In this implementation, the first motor half shaft 100 and the first frustum 102 are of integrally formed structures, to improve structural strength.

Figure 10:
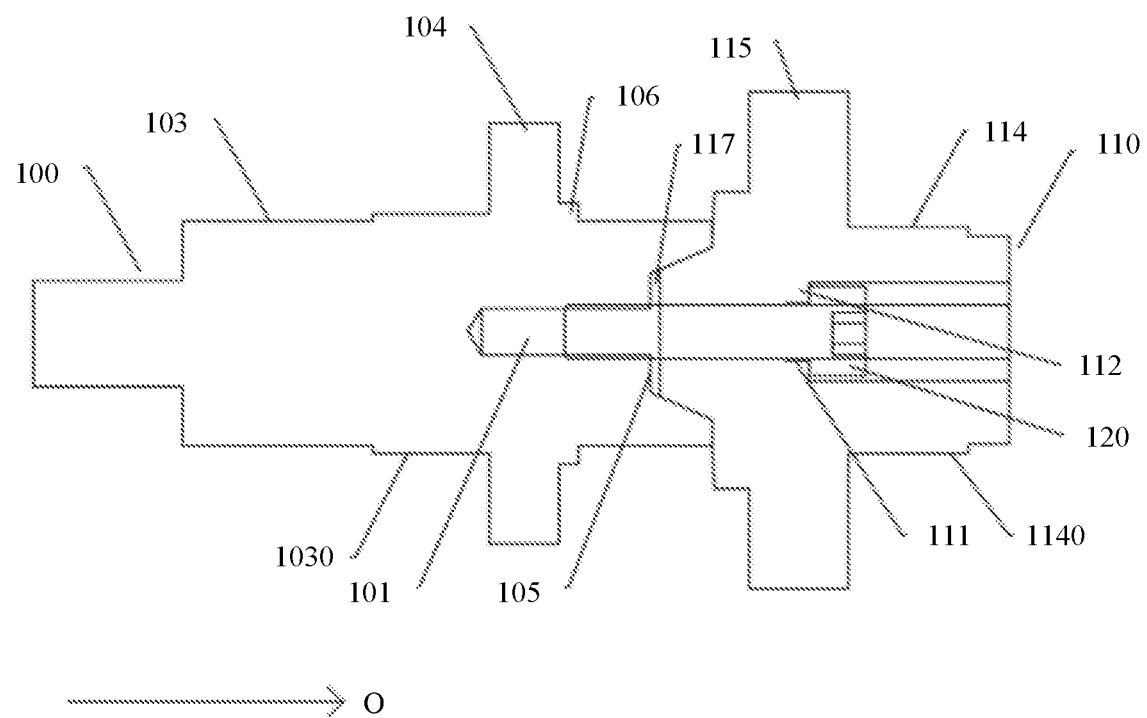
FIG. 10 is a cross-sectional view of a motor shaft in an axial flux motor according to an embodiment of this application.

Still refer to FIG. 10. FIG. 10 is a cross-sectional view of the motor shaft 10 in the axial flux motor 1 according to an embodiment of this application. In a possible implementation, an end plane that is of the first motor half shaft 100 and that faces the second motor half shaft 110 is provided with a second positioning groove 105 curved in a direction away from the second motor half shaft 110, the second motor half shaft 110 includes a second half shaft body 114 and a second frustum 117, the second frustum 117 is located at an end that is of the second half shaft body 114 and that faces the first motor half shaft 100, and the second frustum 117 is located in the second positioning groove 105 and is in interference fit with a groove wall of the second positioning groove 105.

An inner peripheral surface of the second positioning groove 105 matches a shape of an outer peripheral surface of the second frustum 117. When the second frustum 117 is inserted into the second positioning groove 105, the axial direction O of the first motor half shaft 100 is collinear with the axial direction O of the second motor half shaft 110, to implement positioning of the axial direction O of the first motor half shaft 100 and the second motor half shaft 110, so that the first motor half shaft 100 and the second motor half shaft 110 may pass through the fastening hole 111 and the fastening groove 101 by using the fastener 120. The interference fit between the second frustum 117 and the second positioning groove 105 helps eliminate impact of a fit clearance on connection stability, and improves overall structural strength of the motor shaft 10. In this solution, disposing of the second frustum 117 and the second positioning groove 105 ensures coaxiality and a torque transmission capability of the first motor half shaft 100 and the second motor half shaft 110, and avoids affecting normal operation of the axial flux motor 1 due to segmentation of the motor shaft 10.

In this implementation, the second frustum 117 is a truncated cone. In some other implementations, the second frustum 117 may be a triangular cone, a triangular pyramid, a square pyramid, or the like, and an inner wall of the second positioning groove 105 of the first motor half shaft 100 needs to be correspondingly arranged to match a shape of the second frustum 117 of the second motor half shaft 110.

In this implementation, the fastening groove 101 in the first motor half shaft 100 penetrates the groove bottom of the second positioning groove 105, the fastening hole 111 in the second motor half shaft 110 penetrates the second frustum 117, the fastener 120 passes through the fastening groove 101 and the fastening hole 111 to fasten the first motor half shaft 100 and the second motor half shaft 110, and the second frustum 117 is in interference fit with the second positioning groove 105, to improve connection stability of the first motor half shaft 100 and the second motor half shaft 110.

Figure 11:
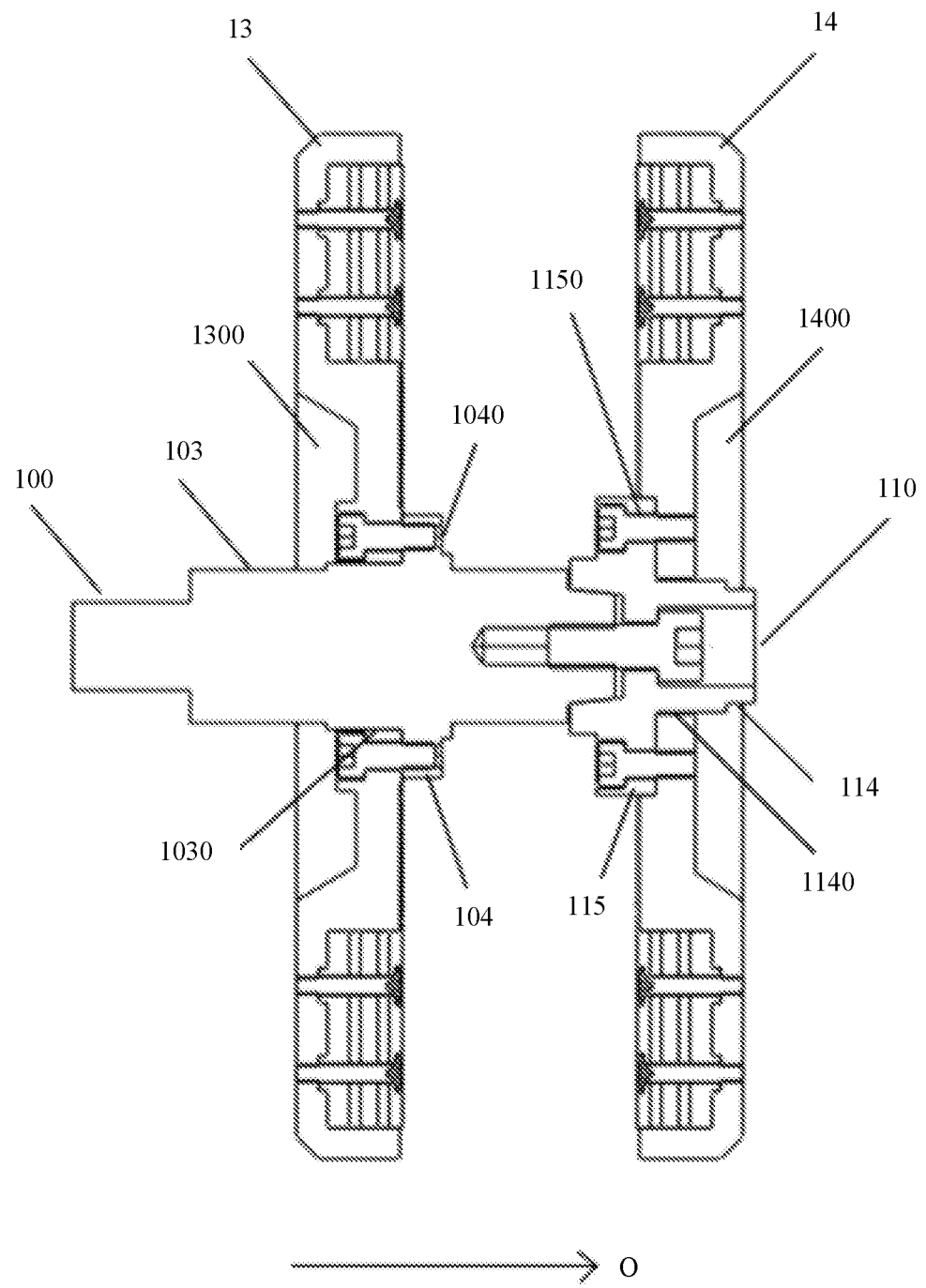
FIG. 11 is a schematic diagram of a structure of a motor shaft, a first rotor, and a second rotor according to an embodiment of this application.

Refer to FIG. 6 and FIG. 11. FIG. 11 is a schematic diagram of a structure of the motor shaft 10, the first rotor 13, and the second rotor 14 according to an embodiment of this application. In a possible implementation, the first motor half shaft 100 includes a first half shaft body 103 and a first shaft shoulder 104 located on an outer periphery of the first half shaft body 103 (as shown in FIG. 11), the double-row angular contact ball bearing 12 is sleeved on the first half shaft body 103 (as shown in FIG. 6), the first half shaft body 103 has a first rotor mounting position 1030, the first rotor mounting position 1030 is used for mounting the first rotor 13 (as shown in FIG. 11), and the first shaft shoulder 104 is configured to fasten the first rotor 13; and in the axial direction of the motor shaft 10, the first shaft shoulder 104 and the first rotor mounting position 1030 are located on a side that is of the double-row angular contact ball bearing 12 and that is away from the second motor half shaft 110. Refer to FIG. 11. The double-row angular contact ball bearing 12 is not shown in FIG. 11. In this implementation, in the axial direction O of the motor shaft 10, the first shaft shoulder 104 is located between the double-row angular contact ball bearing 12 and the first rotor mounting position 1030. When the double-row angular contact ball bearing 12 and the first rotor 13 are mounted, the double-row angular contact ball bearing 12 is sleeved on the first half shaft body 103 in the axial direction O of the motor shaft 10 from an end that is of the first motor half shaft 100 and that is close to the second motor half shaft 110, and the first rotor 13 is sleeved to the first rotor mounting position 1030 in the axial direction O of the motor shaft 10 from an end that is of the first motor half shaft 100 and that is away from the second motor half shaft 110.

In an implementation, the first shaft shoulder 104 is provided with a first shaft shoulder fastening hole 1040 (as shown in FIG. 11), and the first rotor 13 is fixedly connected to the first shaft shoulder 104 at the first rotor mounting position 1030 through the first shaft shoulder fastening hole 1040. The first shaft shoulder fastening hole 1040 extends in the axial direction of the motor shaft 10. Optionally, a fixed connection may be implemented by using a screw, and the screw passes through the first shaft shoulder fastening hole 1040 in the axial direction O of the motor shaft 10. In this solution, the first shaft shoulder 104 is disposed to fasten the first rotor 13. This helps shorten an axial dimension of the axial flux motor 1 while ensuring reliability of a connection between the first rotor 13 and the motor shaft 10 compared with additionally disposing a rotor fastener. In addition, clearance precision between the first rotor 13 and the stator 11 is improved.

In this implementation, the first shaft shoulder 104 is disposed around the first half shaft body 103 (as shown in FIG. 8), and the first half shaft body 103 and the first shaft shoulder 104 are of integrally formed structures.

Figure 12:
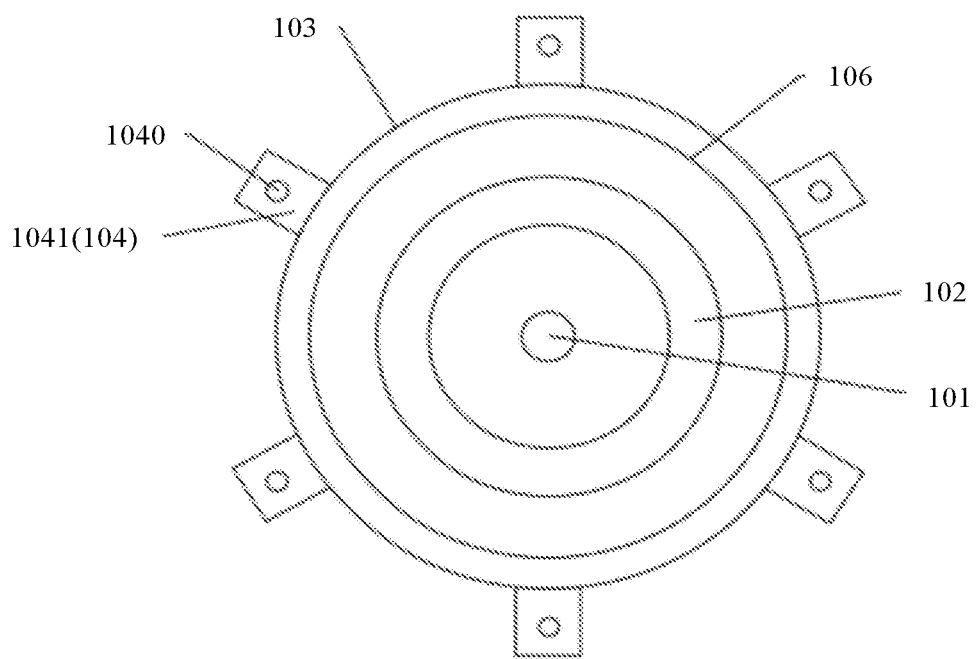
FIG. 12 is a schematic diagram of a structure of a first motor half shaft according to an embodiment of this application.

FIG. 12 is a schematic diagram of a structure of the first motor half shaft according to an embodiment of this application. Specifically, FIG. 12 is a schematic diagram of a structure of the first motor half shaft viewed from a side of the second motor half shaft. In a possible implementation, the first shaft shoulder 104 includes a plurality of first bumps 1041 extending in a radial direction of the motor shaft 10, the plurality of first bumps 1041 are sequentially arranged at intervals on the first half shaft body 103, and the first bumps 1041 are fixedly connected to the first rotor 13. For example, the first bumps 1041 are fixedly connected to the first rotor 13 through screws and pins. A quantity of the first bumps 1041 may be set based on a requirement.

Figure 13:
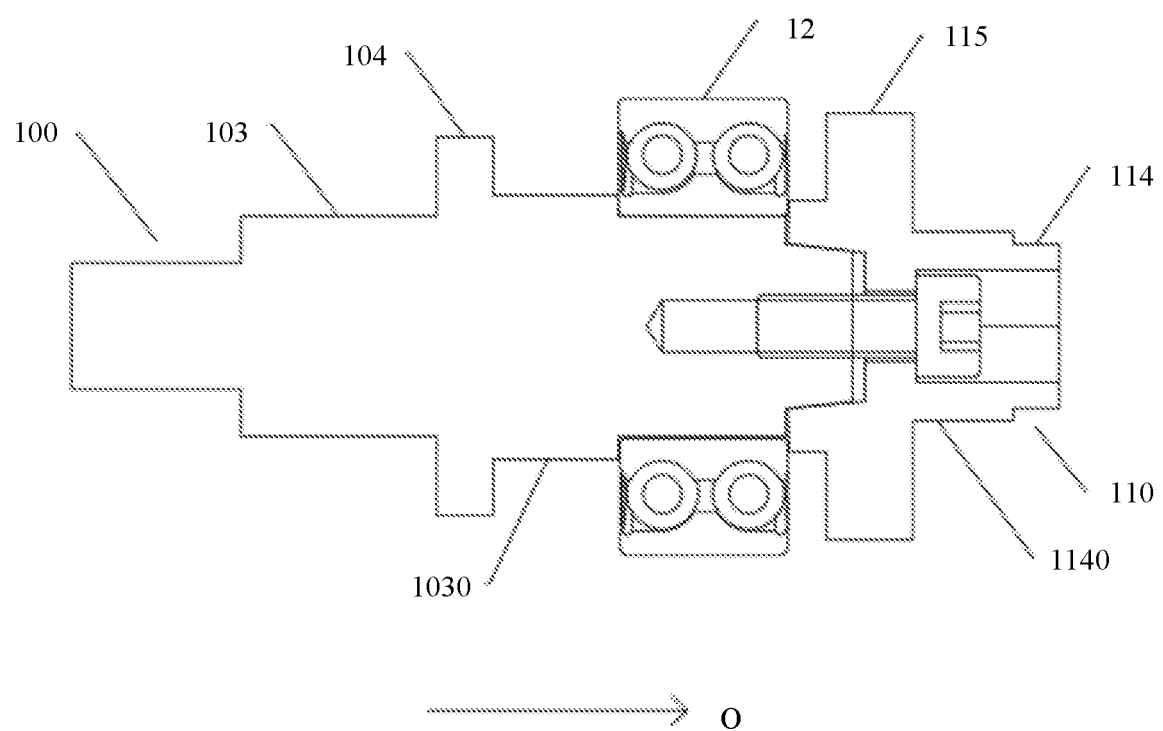
FIG. 13 is a cross-sectional view of a motor shaft and a double-row angular contact ball bearing in an axial flux motor according to an embodiment of this application.

FIG. 13 is a cross-sectional view of the motor shaft 10 and the double-row angular contact ball bearing 12 in the axial flux motor 1 according to an embodiment of this application. In a possible implementation, the first rotor mounting position 1030 is located between the double-row angular contact ball bearing 12 and the first shaft shoulder 104, and the first shaft shoulder 104, the first rotor mounting position 1030, and the double-row angular contact ball bearing 12 are sequentially arranged on the motor shaft 10 in the axial direction O of the motor shaft 10. When the double-row angular contact ball bearing 12 and the first rotor 13 are mounted, the first rotor 13 is first sleeved to the first rotor mounting position 1030 in the axial direction O of the motor shaft 10 from an end that is of the first motor half shaft 100 and that faces the second motor half shaft 110, and then the double-row angular contact ball bearing 12 is sleeved on the first half shaft body 103 in a same manner. In this implementation, because a distance between the first rotor mounting position 1030 and the double-row angular contact ball bearing 12 is close, a clearance between the first rotor 13 and the stator 11 is small. This helps increase torque and further reduces the axial dimension of the axial flux motor 1.

In a possible implementation, the second motor half shaft 110 includes a second half shaft body 114 and a second shaft shoulder 115 outside the second half shaft body 114 (as shown in FIG. 11), the second half shaft body 114 has a second rotor mounting position 1140, the second rotor mounting position 1140 is used for mounting the second rotor 14, and the second shaft shoulder 115 is configured to fasten the second rotor 14. In the axial direction O of the motor shaft 10, the second shaft shoulder 115 and the second rotor mounting position 1140 are located on a side that is of the double-row angular contact ball bearing 12 and that is away from the first motor half shaft 100. In an implementation, the second shaft shoulder 115 is located between the double-row angular contact ball bearing 12 and the second rotor mounting position 1140. When the second rotor 14 is mounted, the second rotor 14 is sleeved to the second rotor mounting position 1140 in the axial direction O of the motor shaft 10 from an end that is of the second motor half shaft 110 and that is away from the first motor half shaft 100.

In an implementation, the second shaft shoulder 115 is provided with a second shaft shoulder fastening hole 1150 (as shown in FIG. 11), and the second rotor 14 is fixedly connected to the second shaft shoulder 115 at the second rotor mounting position 1140 through the second shaft shoulder fastening hole 1150. The first shaft shoulder fastening hole 1040 extends in the axial direction O of the motor shaft 10. Optionally, a fixed connection may be implemented by using a screw, and the screw passes through the first shaft shoulder fastening hole 1040 in the axial direction O of the motor shaft 10. In this solution, the second shaft shoulder 115 is disposed to fasten the second rotor 14. This helps shorten an axial dimension of the axial flux motor 1 while ensuring reliability of a connection between the second rotor 14 and the motor shaft 10 compared with additionally disposing a rotor fastener. In addition, clearance precision between the second rotor 14 and the stator 11 is improved.

In this implementation, the second shaft shoulder 115 is disposed around the second half shaft body 114.

Figure 14:
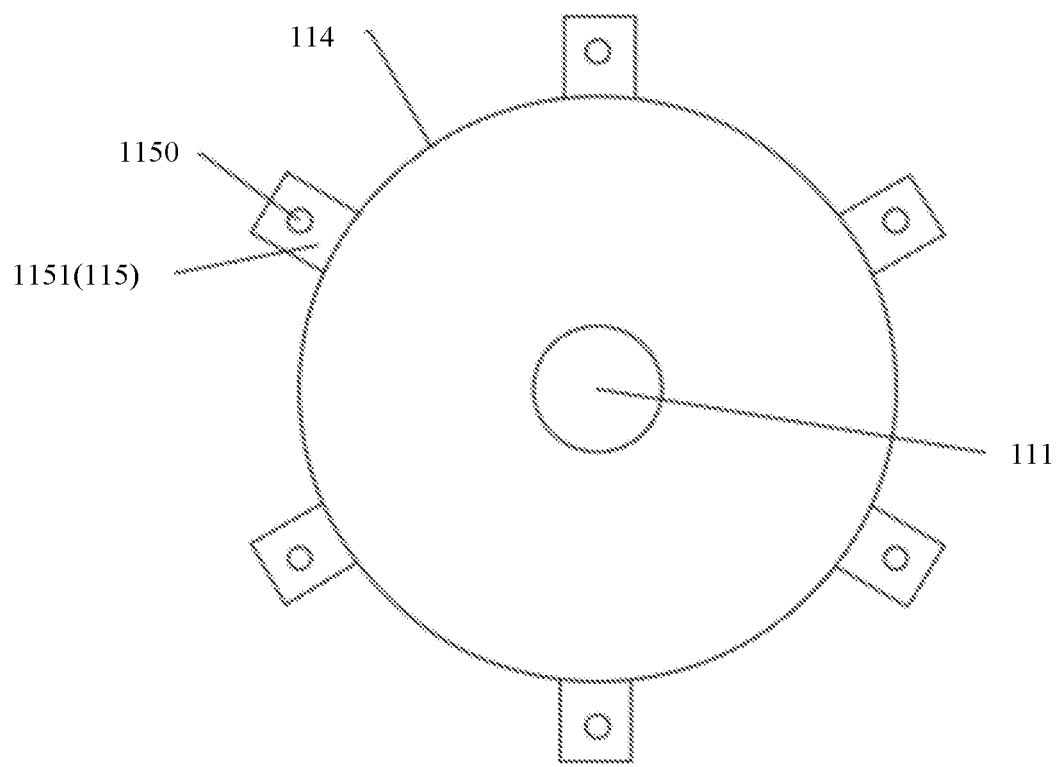
FIG. 14 is a schematic diagram of a structure of a second motor half shaft according to an embodiment of this application.

FIG. 14 is a schematic diagram of a structure of the second motor half shaft according to an embodiment of this application. Specifically, FIG. 14 is a schematic diagram of a structure of the second motor half shaft viewed from a side of the first motor half shaft. In a possible implementation, the second shaft shoulder 115 includes a plurality of second bumps 1151 extending in a radial direction of the motor shaft 10, the plurality of second bumps 1151 are arranged at intervals around the second half shaft body 114, and the second bumps 1151 are fixedly connected to the second rotor 14. For example, the second bumps 1151 are fixedly connected to the second rotor 14 through screws and pins.

Figure 15:
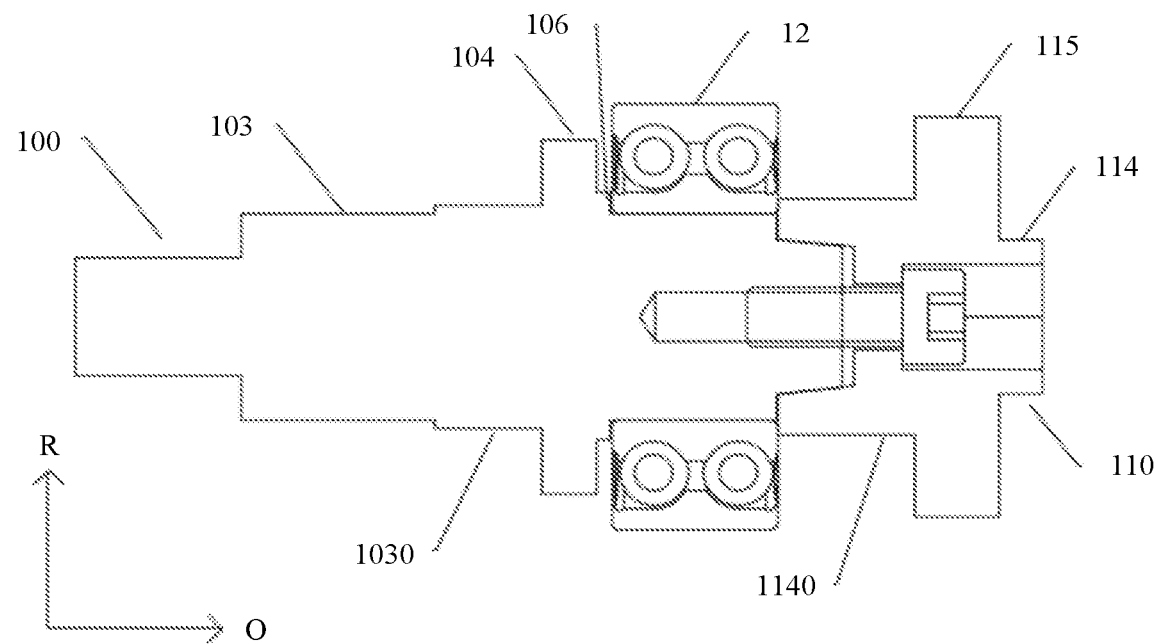
FIG. 15 is a cross-sectional view of a motor shaft and a double-row angular contact ball bearing in an axial flux motor according to an embodiment of this application.

FIG. 15 is a cross-sectional view of the motor shaft 10 and the double-row angular contact ball bearing 12 in the axial flux motor 1 according to an embodiment of this application. In a possible implementation, in the axial direction O of the motor shaft 10, the second rotor mounting position 1140 is located between the double-row angular contact ball bearing 12 and the second shaft shoulder 115. When the second rotor 14 is mounted, the second rotor 14 is sleeved to the second rotor mounting position 1140 in the axial direction O of the motor shaft 10 from an end that is of the second motor half shaft 110 and that faces the first motor half shaft 100. In this implementation, because a distance between the second rotor mounting position 1140 and the double-row angular contact ball bearing 12 is close, a clearance between the second rotor 14 and the stator 11 is small. This helps increase torque and further reduces the axial dimension of the axial flux motor 1.

Figure 16:
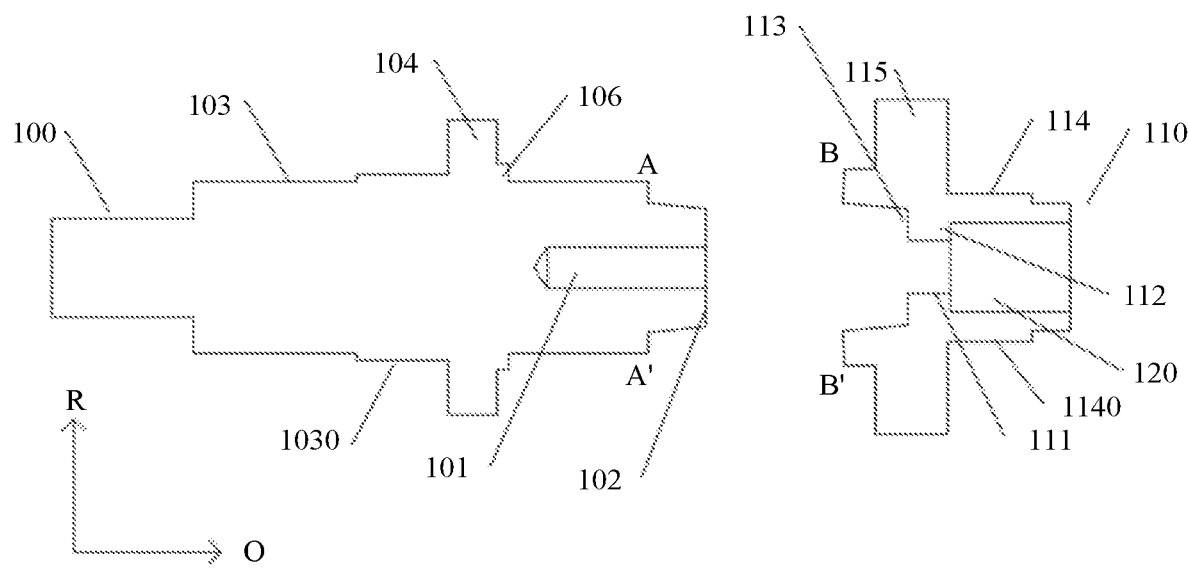
FIG. 16 is a cross-sectional view of a first motor half shaft and a second motor half shaft according to an embodiment of this application.

FIG. 16 is a cross-sectional view of the first motor half shaft and the second motor half shaft according to an embodiment of this application. In a possible implementation, a diameter of an end that is of the second motor half shaft 110 and that faces the double-row angular contact ball bearing 12 is larger than a diameter of an end that is of the first half shaft body 103 and that faces the second motor half shaft 110, an outer periphery of the first half shaft body 103 is further provided with an axial positioning part 106, and two ends that are of the bearing inner ring 122 and that are located in the axial direction O of the motor shaft 10 respectively abut against the second motor half shaft 110 and the axial positioning part 106 (as shown in FIG. 6).

An end that is of the second motor half shaft 110 and that faces the double-row angular contact ball bearing 12 is BB' (as shown in FIG. 16), and an end that is of the first half shaft body 103 and that faces the second motor half shaft 110 is AA'. The end that is of the first half shaft body 103 and that faces the second motor half shaft 110 is also connected to the first frustum 102, and a diameter of BB' is larger than a diameter of AA'. When the second motor half shaft 110 and the first motor half shaft 100 are mounted, BB' protrudes relative to AA' in the radial direction R of the motor shaft 10, and a protruded part of BB' relative to AA' is used to abut against the double-row angular contact ball bearing 12 (as shown in FIG. 6). The axial positioning part 106 is disposed, and the diameter of the end that is of the second motor half shaft 110 and that faces the double-row angular contact ball bearing 12 is arranged to be larger than the diameter of the end that is of the first half shaft body 103 and that faces the second motor half shaft 110, so that the two ends that are of the bearing inner ring 122 of the double-row angular contact ball bearing 12 and that are located in the axial direction O of the motor shaft 10 respectively abut against the second motor half shaft 110 and the axial positioning part 106. This avoids a phenomenon of deviation and dislocation between the bearing inner ring 122 and the first motor half shaft 100 and the second motor half shaft 110. In addition, the axial positioning part 106 is disposed in the motor shaft 10, so that there is no need to use a nut for a fixed connection. Therefore, a structure of the motor shaft 10 is simplified, and mounting and disassembly are more convenient.

Figure 17:
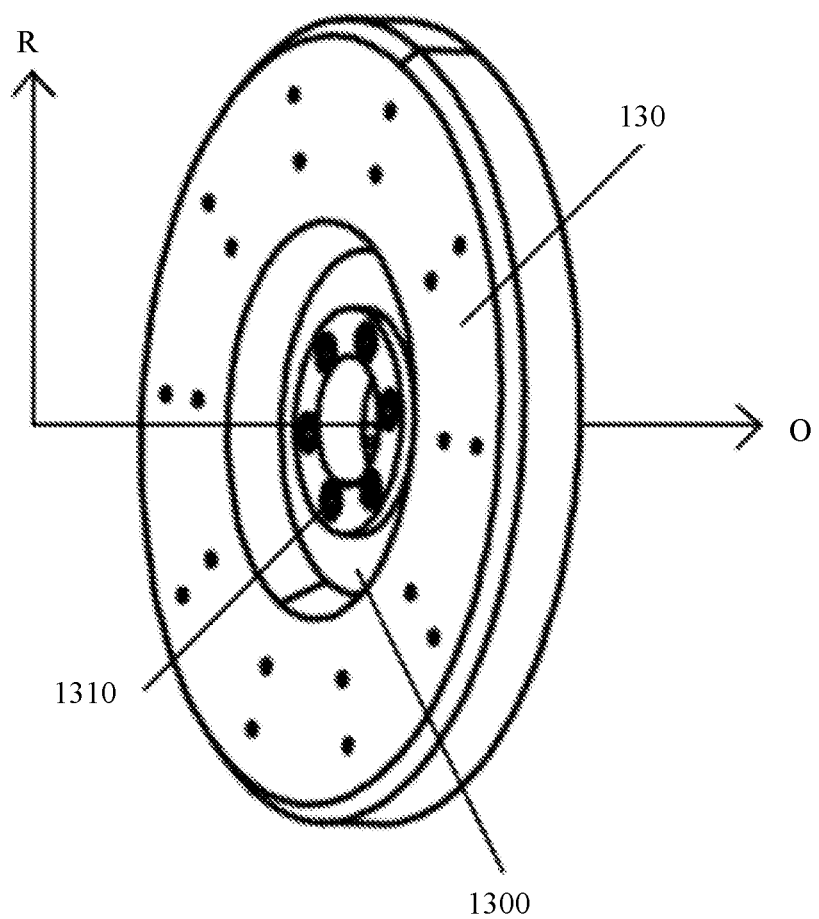
FIG. 17 is a schematic diagram of a structure of a first rotor according to an embodiment of this application.

FIG. 17 is a schematic diagram of a structure of the first rotor 13 according to an embodiment of this application. In a possible implementation, the axial flux motor 1 further includes the first rotor 13, the first rotor 13 is sleeved on the motor shaft 10 and is fixedly connected to the motor shaft 10, a surface that is of the first rotor 13 and that is away from the stator 11 has a first rotor groove 1300 curved in a direction facing the stator 11, and the motor shaft 10 passes through the first rotor groove 1300 (as shown in FIG. 17 and FIG. 6). The first motor half shaft 100 passes through a part of the first rotor groove 1300, the first shaft shoulder 104 is fixedly connected to the first rotor 13, and the first rotor 13 is limited to the first rotor mounting position 1030 of the first motor half shaft 100. In this solution, the first rotor groove 1300 is disposed, so that remaining components may be mounted on the motor shaft 10 corresponding to the first rotor groove 1300. This provides space in the axial direction for the remaining components to be mounted on the motor shaft 10, and helps shorten an axial dimension part of the axial flux motor 1. As shown in FIG. 6, a first end cover bearing 16 is disposed closer to the stator 11, and a part of the first end cover bearing 16 is accommodated in the first rotor groove 1300.

In an implementation, the first rotor 13 includes a rotor back plane 130, and the rotor back plane 130 is configured to be sleeved on the motor shaft 10 of the axial flux motor 1. In this implementation, an axis of the rotor back plane 130 coincides with an axis of the motor shaft 10, an axial direction O of the rotor back plane 130 coincides with the axial direction O of the motor shaft 10, and an extension direction of the axis of the rotor back plane 130 is the axial direction O of the rotor back plane 130, where a radial direction R of the rotor back plane 130 is the same as the radial direction of the motor shaft 10. In this embodiment, the rotor back plane 130 is of a ring-shaped structure. A circumferential direction C of the rotor back plane 130 refers to a circumferential direction surrounding the axial direction O of the rotor back plane 130. The first rotor groove 1300 is located on a surface that is of the rotor back plane 130 and that is away from the stator 11, and the first rotor groove 1300 is curved in a direction facing the stator 11.

In an implementation, a surface that is of the rotor back plane 130 and that faces the stator 11 is provided with a magnetic steel accommodating groove 1320, and the magnetic steel accommodating groove 1320 is configured to accommodate a magnetic steel component in the stator 11, where the magnetic steel accommodating groove 1320 surrounds an outer periphery of the first rotor groove 1300 in a radial direction R of an axis O of the motor shaft.

The bottom of the first rotor groove 1300 is provided with a back plane fastening hole 1310, and the first rotor 13 is fastened to the first motor half shaft 100 at the first rotor mounting position 1030 through the first shaft shoulder fastening hole 1040 and the back plane fastening hole 1310. The back plane fastening hole 1310 extends in the axial direction of the motor shaft 10. Optionally, a fixed connection may be implemented by using a screw, and the screw passes through the first shaft shoulder fastening hole 1040 and the back plane fastening hole 1310 in the axial direction of the motor shaft 10. In this solution, disposing of the back plane fastening hole 1310 helps improve stability of a connection between the first rotor and the motor shaft 10.

Refer to FIG. 6 and FIG. 11. In a possible implementation, the axial flux motor 1 further includes the second rotor 14, the second rotor 14 is sleeved on the motor shaft 10 and is fixedly connected to the motor shaft 10, a surface that is of the second rotor 14 and that is away from the stator 11 has a second rotor groove 1400 curved in a direction facing the stator 11, and the motor shaft 10 passes through the second rotor groove 1400. The first rotor 13 and the second rotor 14 are located on both sides of the stator 11 in the axial direction of the motor shaft 10, and cooperation of the first rotor 13 and the second rotor 14 helps improve operation efficiency of the axial flux motor 1. The second rotor groove 1400 is disposed, so that a component on the side that is of the second rotor 14 and that is away from the stator 11 may be accommodated in the second rotor groove 1400. For example, a second end cover bearing 19 may be disposed in the second rotor groove 1400, to further reduce the axial dimension of the axial flux motor 1.

In an implementation, the second rotor 14 includes a rotor back plane (not shown in the figure), the second rotor groove 1400 is located on a surface that is of the rotor back plane of the second rotor 14 and that faces the stator 11, and the rotor back plane of the second rotor 14 is provided with a magnetic steel accommodating groove, where the magnetic steel accommodating groove is configured to accommodate a magnetic steel component, and the magnetic steel accommodating groove is located on an outer peripheral side of the second rotor groove 1400.

Figure 18:
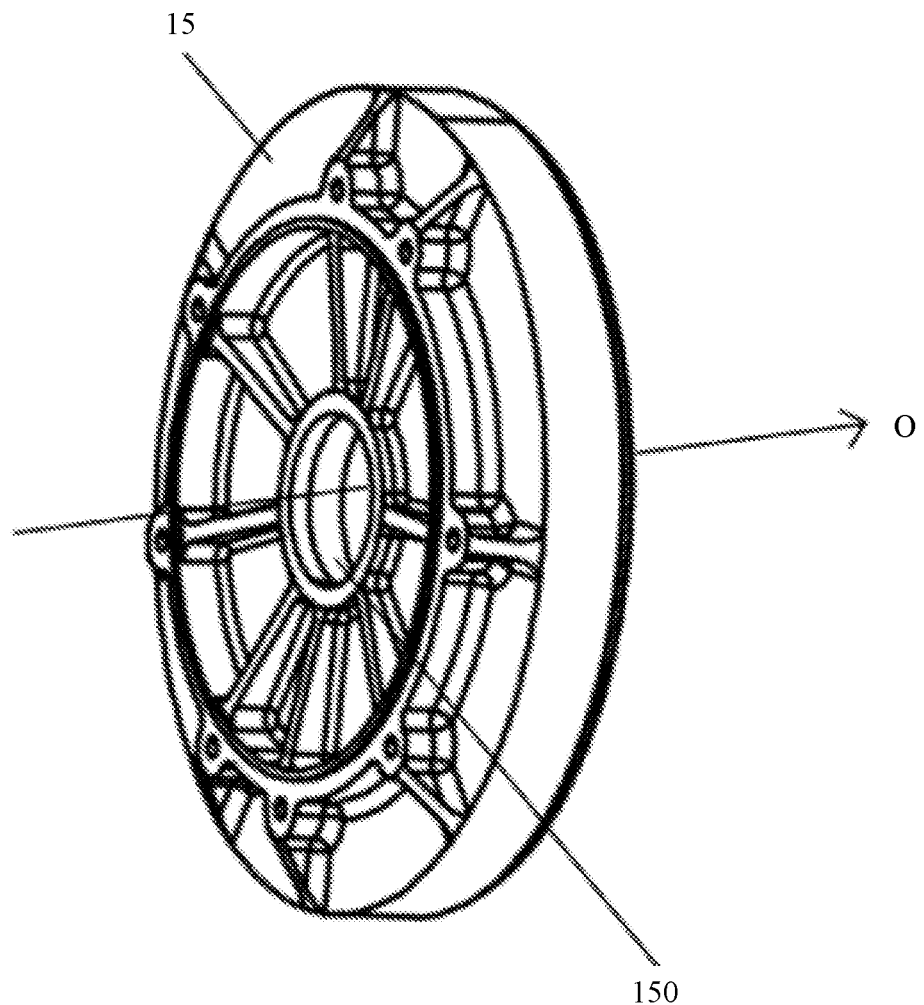
FIG. 18 is a schematic diagram of a structure of a first end cover according to an embodiment of this application.
Figure 19:
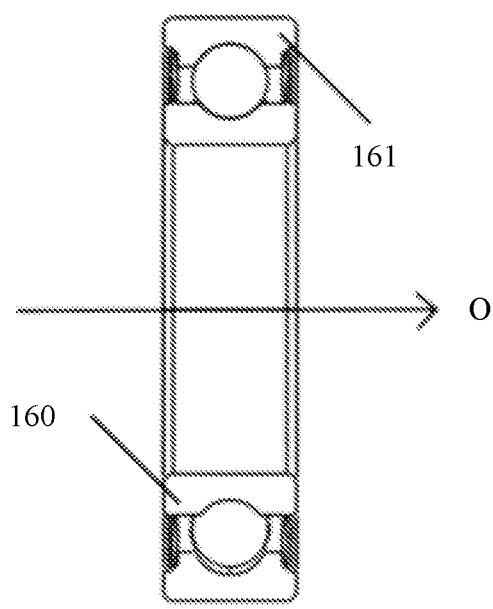
FIG. 19 is a cross-sectional view of a first end cover bearing according to an embodiment of this application.

Refer to FIG. 6, FIG. 18, and FIG. 19. FIG. 18 is a schematic diagram of a structure of the first end cover 15 according to an embodiment of this application. FIG. 19 is a cross-sectional view of the first end cover bearing 16 according to an embodiment of this application. In a possible implementation, the axial flux motor 1 further includes the first end cover 15 and the first end cover bearing 16, the first end cover 15 is rotatably connected to the motor shaft 10 through the first end cover bearing 16, and a part of the first end cover bearing 16 is located in the first rotor groove 1300 (as shown in FIG. 6). When the first end cover bearing 16 is mounted on the motor shaft 10, an axial direction O of the first end cover bearing 16 is the same as the axial direction O of the motor shaft 10. Optionally, the first end cover bearing 16 may be a deep groove ball bearing. In this solution, it is defined that a part of the first end cover bearing 16 is located in the first rotor groove 1300, and a projection of the first end cover bearing 16 on the motor shaft 10 in the radial direction R of the motor shaft 10 overlaps a projection of the first rotor 13 on the motor shaft 10 in the radial direction R of the motor shaft 10. In this way, the first end cover bearing 16 may be arranged closer to the inside of the axial flux motor 1 on the axial direction O of the motor shaft 10, and a dimension occupied by the first end cover bearing 16 on the axial direction O is reduced. Therefore, space utilization of the motor shaft 10 in the axial direction is effectively improved, and an overall structure of the axial flux motor 1 is more compact.

In an implementation, the first end cover 15 includes a first end cover mounting hole 150 (as shown in FIG. 18), and one end of the motor shaft 10 passes through the first end cover mounting hole 150 and is mounted to the inside of the axial flux motor 1. An axial direction O of the first end cover 15 coincides with the axial direction of the motor shaft 10.

In an implementation, the first end cover bearing 16 includes a first end cover bearing inner ring 160 and a first end cover bearing outer ring 161 that are rotatably connected (as shown in FIG. 19), the first end cover bearing inner ring 160 is fixedly connected to the motor shaft 10, the first end cover bearing outer ring 161 fixedly connected to the first end cover 15, and when the axial flux motor 1 is in operation, the stator 11 and the first end cover 15 remain stationary, and the motor shaft 10 rotates synchronously with the first rotor 13 and the second rotor 14.

In a possible implementation, the axial flux motor 1 further includes a second end cover 17 and a housing 18 (as shown in FIG. 6), the housing 18 is located outside the stator 11, the first end cover 15 and the second end cover 17 are fastened to the housing 18 and form accommodating space with the housing 18, and the double-row angular contact ball bearing 12, the stator 11, the first rotor 13, and the second rotor 14 are located in the accommodating space. The first end cover 15, the second end cover 17, and the housing 18 isolate the accommodating space from an external environment, to prevent an internal component of the axial flux motor 1 from damage of the external environment.

In a possible implementation, the second end cover 17 rotates to the motor shaft 10 through the second end cover bearing 19 (as shown in FIG. 6), and at least a part of the second end cover bearing 19 is located in the second rotor groove 1400. This reduces the axial dimension of the axial flux motor 1.

In a possible implementation, a surface that is of the second end cover 17 and that is away from the stator 11 is flush. The center of the second end cover 17 has a mounting component and another component, for example, a resolver 171 (as shown in FIG. 4 and FIG. 6). The mounting component and the another component may be disposed in the second rotor groove 1400. In this way, the surface that is of the second end cover 17 and that is away from the stator 11 is flush, to reduce a dimension of the axial flux motor 1. The resolver 171 is configured to monitor a rotation speed and a location of the axial flux motor 1.

In the embodiment shown in FIG. 6, the double-row angular contact ball bearing 12 is disposed on the motor shaft 10, so that the stator 11 is sleeved on the motor shaft 10 through the double-row angular contact ball bearing 12. The double-row angular contact ball bearing 12 has a smaller axial dimension than a case in which two bearings are used, and the double-row angular contact ball bearing 12 can bear an axial load. Therefore, service life of the axial flux motor 1 is prolonged. Because the axial dimension of the double-row angular contact ball bearing 12 is small, the first shaft shoulder 104 and the second shaft shoulder 115 of the motor shaft 10 may be disposed closer to the double-row angular contact ball bearing 12, and a part of the first shaft shoulder 104 and the second shaft shoulder 115 overlaps the stator 11 in the axial direction O, or a part of the first shaft shoulder 104 and the second shaft shoulder 115 is located inside the stator 11. This further reduces a distance of an air gap between the first rotor 13 and the second rotor 14 and the stator 11, and increases torque of the axial flux motor 1. In this embodiment, rotor back planes of the first rotor 13 and the second rotor 14 are respectively provided with the first rotor groove 1300 and the second rotor groove 1400 that are curved in a direction facing the stator 11, so that parts that are of the first rotor 13 and the second rotor 140 and that are close to the motor shaft 10 are thinner. Therefore, a weight of the axial flux motor 1 is reduced. In addition, parts of the first end cover bearing 16 and the second end cover bearing 19 are respectively accommodated in the first rotor groove 1300 and the second rotor groove 1400. This further reduces an axial dimension of the motor shaft 10 occupied by the first end cover bearing 16 and the second end cover bearing 19. Moreover, central parts of the first end cover 15 and the second end cover 17 may be accommodated in the first rotor groove 1300 and the second rotor groove 1400, so that end planes of the first end cover 15 and the second end cover 17 are flush. Therefore, the axial dimension of the axial flux motor 1 is further reduced, the axial flux motor 1 is smaller, and power density of the axial flux motor 1 is improved.

The foregoing describes in detail the axial motor, the powertrain, and the electric device provided in embodiments of this application. Specific examples are used in this specification to describe principles and embodiments of this application. Descriptions in the foregoing embodiments are merely used to help understand methods and core ideas of this application. In addition, a person of ordinary skill in the art may make modifications to the specific embodiments and the application scope based on the ideas of this application. In conclusion, content of this specification shall not be construed as a limitation to this application.

What is claimed is:
1. An axial flux motor, comprising:
   a motor shaft comprising:
      a first motor half shaft configured to mount a first rotor; and
      a second motor half shaft configured to mount a second rotor, wherein the first motor half shaft and the second motor half shaft are arranged in an axial direction of the motor shaft, and wherein the first motor half shaft is detachably connected to the second motor half shaft;
   a double-row angular contact ball bearing, wherein the double-row angular contact ball bearing comprises a bearing inner ring and a bearing outer ring that are rotatably connected, wherein the double-row angular contact ball bearing is sleeved on the motor shaft, and wherein the bearing inner ring is fixedly connected to the motor shaft; and
   a stator sleeved on the motor shaft through the double-row angular contact ball bearing, wherein the stator is fixedly connected to the bearing outer ring such that the motor shaft can rotate relative to the stator, and wherein the first motor half shaft is configured to mount the double-row angular contact ball bearing.

2. The axial flux motor of claim 1, wherein the double-row angular contact ball bearing in the axial direction of the motor shaft has a first dimension, wherein the stator in the axial direction of the motor shaft has a second dimension, and wherein the first dimension is smaller than the second dimension.

3. The axial flux motor of claim 1, wherein the first motor half shaft comprises an end plane that faces the second motor half shaft, wherein the end plane comprises a fastening groove curved in a direction away from the second motor half shaft, wherein the second motor half shaft comprises a fastening hole that penetrates the second motor half shaft in the axial direction of the motor shaft, and wherein the axial flux motor further comprises a fastener that passes through the fastening hole and the fastening groove in order to detachably connect the first motor half shaft to the second motor half shaft.

4. The axial flux motor of claim 1, wherein the second motor half shaft comprises:
an end plane that faces the first motor half shaft; and
a first positioning groove curved in a direction away from the first motor half shaft, wherein the first motor half shaft comprises:
a first half shaft body comprising a first end; and
a first frustum located at the first end and facing the second motor half shaft, wherein the first frustum is located in the first positioning groove and is in interference fit with a groove wall of the first positioning groove.

5. The axial flux motor of claim 1, wherein the first motor half shaft comprises:
a first half shaft body comprising a first rotor mounting position to mount the first rotor, wherein the double-row angular contact ball bearing is sleeved on the first half shaft body; and
a first shaft shoulder located on an outer periphery of the first half shaft body, wherein the first shaft shoulder fastens the first rotor, and wherein in the axial direction of the motor shaft, the first shaft shoulder and the first rotor mounting position are located on a side that is of the double-row angular contact ball bearing and that is away from the second motor half shaft.

6. The axial flux motor of claim 5, wherein the second motor half shaft comprises a first end that faces the double-row angular contact ball bearing, wherein a diameter of the first end is larger than a diameter of a first half shaft body end that faces the second motor half shaft, wherein the outer periphery of the first half shaft body is further comprising an axial positioning part, and wherein two ends that are of the bearing inner ring and that are located in the axial direction of the motor shaft respectively abut against the second motor half shaft and the axial positioning part.

7. The axial flux motor of claim 1, wherein the axial flux motor further comprises the first rotor that is sleeved on the motor shaft and is fixedly connected to the motor shaft, wherein a surface of the first rotor and away from the stator has a first rotor groove curved in a direction facing the stator, and wherein the motor shaft passes through the first rotor groove.

8. The axial flux motor of claim 7, wherein the axial flux motor further comprises a first end cover and a first end cover bearing, wherein the first end cover is rotatably connected to the motor shaft through the first end cover bearing, and wherein a part of the first end cover bearing is located in the first rotor groove.

9. A powertrain, comprising:
an axial flux motor, comprising:
a motor shaft comprising:
a first motor half shaft for mounting a first rotor; and
a second motor half shaft for mounting a second rotor, wherein the first motor half shaft and the second motor half shaft are arranged in an axial direction of the motor shaft, and wherein the first motor half shaft is detachably connected to the second motor half shaft;
a double-row angular contact ball bearing, wherein the double-row angular contact ball bearing comprises a bearing inner ring and a bearing outer ring that are rotatably connected, wherein the double-row angular contact ball bearing is sleeved on the motor shaft, and wherein the bearing inner ring is fixedly connected to the motor shaft; and
a stator sleeved on the motor shaft through the double-row angular contact ball bearing, wherein the stator is fixedly connected to the bearing outer ring such that the motor shaft can rotate relative to the stator; and
a gearbox comprising a power input shaft transmittingly connected to the axial flux motor,
wherein the axial flux motor is configured to output power to the power input shaft, and
wherein the first motor half shaft is for mounting the double-row angular contact ball bearing.

10. An electric device, comprising:
a powertrain, comprising:
an axial flux motor, comprising:
a motor shaft comprising:
a first motor half shaft configured to mount a first rotor; and
a second motor half shaft configured to mount a second rotor, wherein the first motor half shaft and the second motor half shaft are arranged in an axial direction of the motor shaft, and wherein the first motor half shaft is detachably connected to the second motor half shaft;
a double-row angular contact ball bearing, wherein the double-row angular contact ball bearing comprises a bearing inner ring and a bearing outer ring that are rotatably connected, wherein the double-row angular contact ball bearing is sleeved on the motor shaft, and wherein the bearing inner ring is fixedly connected to the motor shaft; and
a stator sleeved on the motor shaft through the double-row angular contact ball bearing, wherein the stator is fixedly connected to the bearing outer ring such that the motor shaft can rotate relative to the stator; and
a gearbox comprising a power input shaft transmittingly connected to the axial flux motor, and wherein the axial flux motor is configured to output power to the power input shaft; and
a device body,
wherein the powertrain is mounted on the device body, and
wherein the first motor half shaft is configured to mount the double-row angular contact ball bearing.

11. The axial flux motor of claim 1, wherein the first motor half shaft comprises:
an end plane that faces the second motor half shaft; and a second positioning groove curved in a direction away from the second motor half shaft, wherein the second motor half shaft comprises:
- a second half shaft body comprising a second end; and
- a second frustum is located at the second end and faces the first motor half shaft, wherein the second frustum is located in the second positioning groove and is in interference fit with a groove wall of the second positioning groove.

12. The powertrain of claim 9, wherein the double-row angular contact ball bearing in the axial direction of the motor shaft has a first dimension, wherein the stator in the axial direction of the motor shaft has a second dimension, and wherein the first dimension is smaller than the second dimension.

13. The powertrain of claim 9, wherein the axial flux motor further comprises:
- an end plane of the first motor half shaft that faces the second motor half shaft, wherein the end plane comprises a fastening groove curved in a direction away from the second motor half shaft, wherein the second motor half shaft comprises a fastening hole that penetrates the second motor half shaft in the axial direction of the motor shaft; and
- a fastener passing through the fastening hole and the fastening groove in order to detachably connect the first motor half shaft to the second motor half shaft.

14. The powertrain of claim 9, wherein the second motor half shaft comprises:
- an end plane that faces the first motor half shaft; and
- a first positioning groove curved in a direction away from the first motor half shaft, wherein the first motor half shaft comprises:
  - a first half shaft body comprising a first end; and
  - a first frustum located at the first end and facing the second motor half shaft, wherein the first frustum is located in the first positioning groove and is in interference fit with a groove wall of the first positioning groove.

15. The powertrain of claim 9, wherein the first motor half shaft comprises:
- a first half shaft body comprising a first rotor mounting position configured for mounting the first rotor, wherein the double-row angular contact ball bearing is sleeved on the first half shaft body; and
- a first shaft shoulder located on an outer periphery of the first half shaft body, wherein the first shaft shoulder is configured to fasten the first rotor, and wherein in the axial direction of the motor shaft, the first shaft shoulder and the first rotor mounting position are located on a side that is of the double-row angular contact ball bearing and that is away from the second motor half shaft.

16. The powertrain of claim 15, wherein the second motor half shaft comprises a first end that faces the double-row angular contact ball bearing, wherein a diameter of the first end is larger than a diameter of a first half shaft body end that faces the second motor half shaft, wherein the outer periphery of the first half shaft body further comprises an axial positioning part, and wherein two ends that are of the bearing inner ring and that are located in the axial direction of the motor shaft respectively abut against the second motor half shaft and the axial positioning part.

17. The powertrain of claim 9, wherein the axial flux motor further comprises the first rotor that is sleeved on the motor shaft and is fixedly connected to the motor shaft, wherein a surface of the first rotor and away from the stator has a first rotor groove curved in a direction facing the stator, and wherein the motor shaft passes through the first rotor groove.

18. The powertrain of claim 17, wherein the axial flux motor further comprises a first end cover and a first end cover bearing, wherein the first end cover is rotatably connected to the motor shaft through the first end cover bearing, and wherein a part of the first end cover bearing is located in the first rotor groove.

19. The electric device of claim 10, wherein the double-row angular contact ball bearing in the axial direction of the motor shaft has a first dimension, wherein the stator in the axial direction of the motor shaft has a second dimension, and wherein the first dimension is smaller than the second dimension.

20. The electric device of claim 10, wherein the first motor half shaft comprises an end plane that faces the second motor half shaft, wherein the end plane comprises a fastening groove curved in a direction away from the second motor half shaft, wherein the second motor half shaft comprises a fastening hole that penetrates the second motor half shaft in the axial direction of the motor shaft, and wherein the axial flux motor further comprises a fastener that passes through the fastening hole and the fastening groove in order to detachably connect the first motor half shaft to the second motor half shaft.

* * * * *